US011019332B2

(12) United States Patent
Wang et al.

(10) Patent No.: US 11,019,332 B2
(45) Date of Patent: May 25, 2021

(54) CHROMA INTRA PREDICTION IN VIDEO CODING

(71) Applicant: QUALCOMM Incorporated, San Diego, CA (US)

(72) Inventors: Hongtao Wang, San Diego, CA (US); Han Huang, San Diego, CA (US); Yu Han, San Diego, CA (US); Geert Van der Auwera, Del Mar, CA (US); Wei-Jung Chien, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/829,626

(22) Filed: Mar. 25, 2020

(65) Prior Publication Data

US 2020/0314419 A1    Oct. 1, 2020

Related U.S. Application Data

(60) Provisional application No. 62/826,820, filed on Mar. 29, 2019.

(51) Int. Cl.
*H04N 19/11* (2014.01)
*H04N 19/139* (2014.01)
(Continued)

(52) U.S. Cl.
CPC ........... *H04N 19/11* (2014.11); *H04N 19/132* (2014.11); *H04N 19/139* (2014.11);
(Continued)

(58) Field of Classification Search
CPC .... H04N 19/11; H04N 19/139; H04N 19/132; H04N 19/176; H04N 19/70; H04N 19/186; H04N 19/159
(Continued)

(56) References Cited

U.S. PATENT DOCUMENTS

2014/0198855 A1   7/2014  Sole Rojals et al.
2020/0304806 A1*  9/2020  Zhao .................... H04N 19/105
2020/0322601 A1* 10/2020  Ko ........................ H04N 19/11

OTHER PUBLICATIONS

Bross B., et al., "Versatile Video Coding (Draft 4)", Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M1001-v5, 287 pages.
(Continued)

*Primary Examiner* — Hee-Yong Kim
(74) *Attorney, Agent, or Firm* — Shumaker & Sieffert, P.A.

(57) ABSTRACT

A video coder selects a set of wide-angle intra prediction directions based on a size of a luma block of a picture having a YUV 4:2:2 chroma sampling format. Additionally, the video coder determines an intra prediction direction for the luma block. The intra prediction direction for the luma block is in the set of wide-angle intra prediction directions. The video coder also determines an intra prediction direction for a chroma block. The luma block is collocated in the picture with the chroma block. The chroma block has a different width/height ratio than the luma block. The intra prediction direction for the chroma block is guaranteed to have the intra prediction direction for the luma block. The video coder uses the intra prediction directions for the luma and chroma blocks to generate prediction blocks for the luma and chroma blocks, respectively.

24 Claims, 21 Drawing Sheets

(51) Int. Cl.
  *H04N 19/132* (2014.01)
  *H04N 19/159* (2014.01)
  *H04N 19/70* (2014.01)
  *H04N 19/186* (2014.01)
  *H04N 19/176* (2014.01)

(52) U.S. Cl.
  CPC ......... *H04N 19/159* (2014.11); *H04N 19/176* (2014.11); *H04N 19/186* (2014.11); *H04N 19/70* (2014.11)

(58) Field of Classification Search
  USPC .................................................. 375/240.02
  See application file for complete search history.

(56) References Cited

OTHER PUBLICATIONS

Chen J., et al., "Algorithm description for Versatile Video Coding and Test Model 4 (VTM 4)", Joint Video Experts Team (JVET) of ITU-T SG 16 WP 3 and ISO/IEC JTC 1/SC 29/WG 11, JVET-M1002-v1, Jan. 9-18, 2019, 61 pages.

Chen J., et al., "Algorithm Description of Joint Exploration Test Model 1," 1, JVET Meeting, Oct. 19-21, 2015, Geneva;(The Joint Video Exploration Team of ISO/IEC JTC1/SC29/WG11 and ITU-T SG.16 ); URL: http://phenix.int-evry.fr/jvet/, No. JVET-A1001 Feb. 24, 2016 (Feb. 24, 201), XP030150000, 27 pages.

Chen J., et al., "JVET-G1001: Algorithm Description of Joint Exploration Test Model 7 (JEM7)", JVET-G1001-V1, Joint Video Exploration Team (JVET)of ITU-T SG 16 WP 3 and ISO/IEC JTC 1/SC 29/WG 11, 7th Meeting, Jul. 13, 2017-Jul. 21, 2017, Torino, Aug. 19, 2017 (Aug. 19, 2017), 51 Pages, XP030150980, pp. i-iv, Retrieved from the Internet: URL: http://phenix.int-evry.fr/jvet/doc_end_user/documents/7_Torino/wg11/JVET-G0001-v1.zip, p. 20, Paragraph 2.3.7—p. 23, Paragraph 2.3.7.6, p. 17, Paragraph 2.3.5—p. 18, section 2, sections 2.1.1. 2.3.1.

"Information technology—Dynamic Adaptive Streaming over HTTP {DASH)—Part 1: Media Presentation Description and Segment Formats," ISO/IEC 23009-1, International Standard, Draft third edition, Jan. 9, 2017, 216 pp.

International Search Report and Written Opinion—PCT/US2020/024923—ISO/IEC—dated May 26, 2020 18 Pages.

ITU-T H265, Series H: Audiovisual and Multimedia Systems, Infrastructure of Audiovisual Services—Coding of Moving Video, High Efficiency Video Coding, The International Telecommunication Union, Jun. 2019, 696 Pages.

Iwamura S., et al., "Non-CE3: On Chroma DM Derivation Table for 4:2:2 Chroma Format", 15. JVET Meeting, Jul. 3, 2019-Jul. 12, 2019, Gothenburg, (The Joint Video Exploration Team of ISO/IEC JTC1/SC29/WG11 and ITU-TSG.16), No. JVET-O0655, Jun. 26, 2019 (Jun. 26, 2019), XP030220179, 4 pages, Retrieved from the Internet: URL: http://phenix.int-evry.fr/jvet/doc_enduser/documents/15_Gothenburgfwg11/JVET-O0655-v1.zip JVET-O0655.docx. [retrieved on Jun. 26, 2019] Problem statement and proposed modification; p. 1-p. 2; figure 1.

Lainema J., et al., "Intra Coding of the HEVC Standard", IEEE Transactions on Circuits and Systems for Video Technology, Institute of Electrical and Electronics Engineers, USA, vol. 22, No. 12, Dec. 1, 2012 (Dec. 1, 2012), XP011487148, pp. 1792-1801.

Minezawa A., et al., "AHG5: Simplification of Chroma intra prediction process for YUV4:2:2 coding," 13. JCT-VC Meeting; 104. MPEG Meeting; Apr. 18, 2013-Apr. 26, 2013; Incheon; (Joint Collaborative Team on Video Coding of ISO/IEC JTC1/SC29/WG11 and ITU-T SG.16); URL: http://wftp3.itu.int/av-arch/jctvc-site/,, No. JCTVC-M0156, Apr. 9, 2013 (Apr. 9, 2013), XP030114113, pp. 1-8.

Ohm J-R., et al., "MPEG-4 Advanced Video Coding", MPEG Doc#: N7314, Jul. 2005, 11 Pages.

T-C Ma (Kwai), et al., "Non-CE3: Unification on WAIP for Normal and ISP Intra Prediction", 14. JVET Meeting, Mar. 19, 2019-Mar. 27, 2019, Geneva, (The Joint Video Exploration Team of ISO/IEC JTC1/SC29/WG11 and ITU-TSG.16), No. JVET-N0339, Mar. 20, 2019 (Mar. 20, 2019), XP030203941, 4 pages, Retrieved from the Internet: URL: http://phenix.int-evry.fr/jvet/doc_enduser/documents/14_Geneva/wg11/JVET-N0339-v2.zip JVET-N0339_r1 .docx. [retrieved on Mar. 20, 2019] p. 1-p. 2.

\* cited by examiner

| predModeIntra | intraPredAngle | predModeIntra | intraPredAngle | predModeIntra | intraPredAngle | predModeIntra | intraPredAngle | predModeIntra | intraPredAngle | predModeIntra | intraPredAngle |
|---|---|---|---|---|---|---|---|---|---|---|---|
| 4 | 26 | 21 | −3 | 38 | −20 | 55 | 6 | 72 | 64 |  |  |
| 3 | 29 | 20 | −2 | 37 | −23 | 54 | 4 | 71 | 57 |  |  |
| 2 | 32 | 19 | −1 | 36 | −26 | 53 | 3 | 70 | 51 |  |  |
| −1 | 35 | 18 | 0 | 35 | −29 | 52 | 2 | 69 | 45 |  |  |
| −2 | 39 | 17 | 1 | 34 | −32 | 51 | 1 | 68 | 39 |  |  |
| −3 | 45 | 16 | 2 | 33 | −29 | 50 | 0 | 67 | 35 |  |  |
| −4 | 51 | 15 | 3 | 32 | −26 | 49 | −1 | 66 | 32 |  |  |
| −5 | 57 | 14 | 4 | 31 | −23 | 48 | −2 | 65 | 29 |  |  |
| −6 | 64 | 13 | 6 | 30 | −20 | 47 | −3 | 64 | 26 |  |  |
| −7 | 73 | 12 | 8 | 29 | −18 | 46 | −4 | 63 | 23 | 80 | 512 |
| −8 | 86 | 11 | 10 | 28 | −16 | 45 | −6 | 62 | 20 | 79 | 341 |
| −9 | 102 | 10 | 12 | 27 | −14 | 44 | −8 | 61 | 18 | 78 | 256 |
| −10 | 128 | 9 | 14 | 26 | −12 | 43 | −10 | 60 | 16 | 77 | 171 |
| −11 | 171 | 8 | 16 | 25 | −10 | 42 | −12 | 59 | 14 | 76 | 128 |
| −12 | 256 | 7 | 18 | 24 | −8 | 41 | −14 | 58 | 12 | 75 | 102 |
| −13 | 341 | 6 | 20 | 23 | −6 | 40 | −16 | 57 | 10 | 74 | 86 |
| −14 | 512 | 5 | 23 | 22 | −4 | 39 | −18 | 56 | 8 | 73 | 73 |

FIG. 5

CHROMA INTRA PREDICTION IN VIDEO CODING

This application claims the benefit of U.S. Provisional Patent Application No. 62/826,820, filed Mar. 29, 2019, the entire content of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for chroma intra prediction modes for chroma sampling formats in video codecs. More specifically, this disclosure includes examples in which a video encoder and a video decoder determine a set of wide-angle intra prediction directions based on a size of a luma block of a picture that has a YUV 4:2:2 chroma sampling format. The video encoder and the video decoder determine an intra prediction direction for a chroma block that is collocated with the luma block such that the intra prediction direction for the chroma block is guaranteed to have the intra prediction direction for the luma block despite the chroma block having a different width/height ratio, in terms of numbers of pixels, than the luma block.

In one example, this disclosure describes a method of coding video data, the method comprising: selecting a set of wide-angle intra prediction directions based on a size of a luma block of a picture having a YUV 4:2:2 chroma sampling format; determining an intra prediction direction for the luma block, wherein the intra prediction direction for the luma block is in the set of wide-angle intra prediction directions; determining an intra prediction direction for a chroma block, wherein: the luma block is collocated in the picture with the chroma block, the chroma block has a different width/height ratio than the luma block, and the intra prediction direction for the chroma block is guaranteed to have the intra prediction direction for the luma block; using the intra prediction direction for the luma block to generate a prediction block for the luma block; using the intra prediction direction for the chroma block to generate a prediction block for the chroma block; coding the luma block based on the prediction block for the luma block; and coding the chroma block based on the prediction block for the chroma block.

In another example, this disclosure describes a device for coding video data, the device comprising: a memory to store the video data; and one or more processors implemented in circuitry, wherein the one or more processors are configured to: select a set of wide-angle intra prediction directions based on a size of a luma block of a picture having a YUV 4:2:2 chroma sampling format; determine an intra prediction direction for the luma block, wherein the intra prediction direction for the luma block is in the set of wide-angle intra prediction directions; determine an intra prediction direction for a chroma block, wherein: the luma block is collocated in the picture with the chroma block, the chroma block has a different width/height ratio than the luma block, and the intra prediction direction for the chroma block is guaranteed to have the intra prediction direction for the luma block; use the intra prediction direction for the luma block to generate a prediction block for the luma block; use the intra prediction direction for the chroma block to generate a prediction block for the chroma block; code the luma block based on the prediction block for the luma block; and code the chroma block based on the prediction block for the chroma block.

In another example, this disclosure describes a device for coding video data, the device comprising: means for selecting a set of wide-angle intra prediction directions based on a size of a luma block of a picture having a YUV 4:2:2 chroma sampling format; means for determining an intra prediction direction for the luma block, wherein the intra prediction direction for the luma block is in the set of wide-angle intra prediction directions; means for determining an intra prediction direction for a chroma block, wherein: the luma block is collocated in the picture with the chroma block, the chroma block has a different width/height ratio than the luma block, and the intra prediction direction for the chroma block is guaranteed to have the intra prediction direction for the luma block; means for using the intra prediction direction for the luma block to generate a prediction block for the luma block; means for using the intra prediction direction for the chroma block to generate a prediction block for the chroma block; means for coding the luma block based on the prediction block for the luma block; and means for coding the chroma block based on the prediction block for the chroma block.

In another example, this disclosure describes a computer-readable storage medium having stored thereon instructions that, when executed, cause one or more processors to: select a set of wide-angle intra prediction directions based on a size of a luma block of a picture having a YUV 4:2:2 chroma sampling format; determine an intra prediction direction for the luma block, wherein the intra prediction direction for the luma block is in the set of wide-angle intra prediction directions; determine an intra prediction direction for a chroma block, wherein: the luma block is collocated in the picture with the chroma block, the chroma block has a different width/height ratio than the luma block, the intra prediction direction for the chroma block is guaranteed to have the intra prediction direction for the luma block; use the intra prediction direction for the luma block to generate a prediction block for the luma block; use the intra prediction direction for the chroma block to generate a prediction block for the chroma block; code the luma block based on the prediction block for the luma block; and code the chroma block based on the prediction block for the chroma block.

The details of one or more examples are set forth in the accompanying drawings and the description below. Other features, objects, and advantages will be apparent from the description, drawings, and claims.

BRIEF DESCRIPTION OF DRAWINGS

FIG. 5 is a table showing intraPredAngle as defined in Versatile Video Coding (VVC).

DETAILED DESCRIPTION

Figure 1:
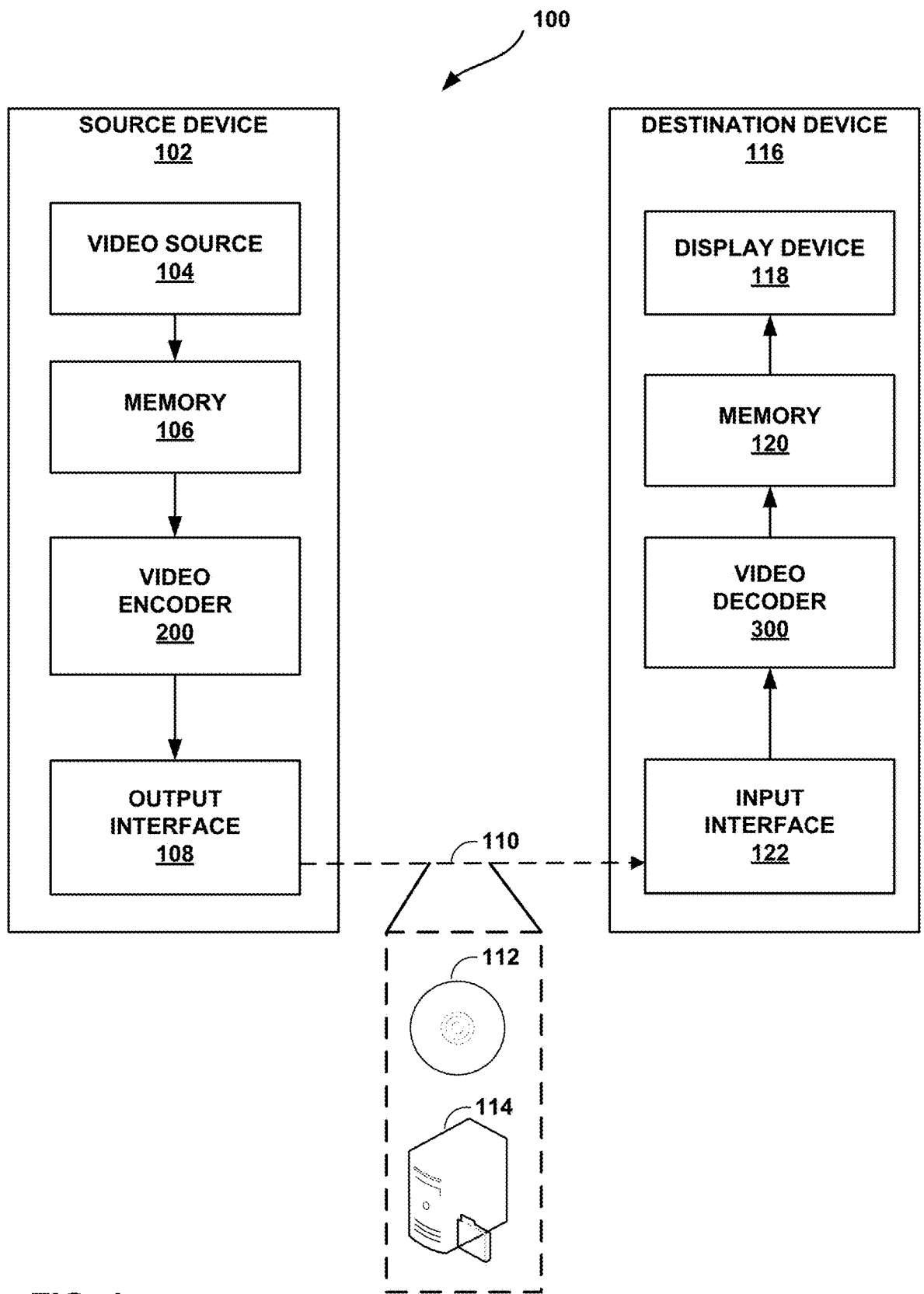
FIG. 1 is a block diagram illustrating an example video encoding and decoding system that may perform the techniques of this disclosure.

Intra prediction is a technique in which a block of video data is predicted based on neighboring blocks in the same picture. Intra prediction may be implemented using a variety of intra prediction modes. The intra prediction modes may include directional intra prediction modes. Each of the directional intra prediction modes corresponds to a different angle. When a block is predicted using a directional intra prediction mode, a video coder (e.g., a video encoder or a video decoder) may determine, for each respective sample of the block, a respective reference location in a set of reference samples in a row of samples above the block or a column of samples to the left of the current block.

The reference location for a sample of the block lies on a line that passes through the sample of the block at the angle (i.e., intra prediction direction) corresponding to the directional intra prediction mode. The video coder may then determine, based on the reference samples, a sample value that corresponds to the reference location for the sample. The video coder may assign the sample value that corresponds to the reference location for the sample as a prediction value for the sample. By doing this for each sample of the block, the video coder may determine a prediction value for each sample of the block and thereby generate a prediction block.

Wide-angle intra prediction is a technique that may be used with non-square blocks. Wide-angle intra prediction uses additional directional intra prediction modes corresponding to angles that are beyond 45° clockwise from vertical or beyond −135° clockwise from vertical (i.e., 135° counterclockwise from vertical). For ease of explanation, degrees of angles (i.e., intra prediction directions) used in this disclosure may be assumed to be in terms of degrees clockwise from vertical. The additional directional intra prediction modes usable in a non-square block allow for the directional intra prediction modes to correspond to directions that range, in a counterclockwise manner, from a bottom-left direction for the block and a top-right direction for the block. The bottom-left direction for the block is from a top-right corner of the block to a bottom-left corner of the block. The top-right direction for the block is from the bottom-left corner of the block to the top-right corner of the block.

Thus, if the height of a block is greater than the width of the block, a set of non-wide-angle intra prediction modes may correspond to intra prediction directions beyond the top-right direction for the block. Accordingly, the video coder reallocates indexes of intra prediction modes corresponding to directions beyond the top-right direction for the block to wide-angle intra prediction modes that correspond to directions ranging from a direction −135° clockwise from vertical to the bottom-left direction for the block. For example, assume that intra prediction mode 66 corresponds to a direction 45° clockwise from vertical. In this example, when the height of a block is greater than the width of the block, the direction 45° clockwise from vertical is beyond the top-right direction for the block. Accordingly, the video coder may reallocate intra prediction mode 66 so that intra prediction mode 66 instead corresponds to a direction that is between −135° clockwise and the bottom-left direction for the block.

Likewise, if the width of a block is greater than the height of the block, a set of non-wide-angle intra prediction modes may correspond to directions beyond the bottom-right direction for the block. Accordingly, the video coder reallocates the non-wide-angle intra prediction modes corresponding to directions beyond the bottom-left direction for the block to wide-angle intra prediction modes that range from a direction 45° clockwise from vertical to the top-right direction for the block.

In many video coding standards, a picture includes a set of luma samples and two sets of chroma samples. A video coder may perform intra prediction separately for the luma and chroma samples of a picture. Thus, the video coder may generate a luma prediction block and two chroma prediction blocks for the same part of the picture. Because the luma block and two corresponding chroma blocks may cover collocated parts of the picture, the luma block and two corresponding chroma blocks may be referred to as collocated blocks.

Direct mode (DM) is a tool for enhancing coding efficiency in intra prediction of chroma blocks. When a video coder uses DM mode to code a chroma block, the video coder assumes that the chroma block use an intra prediction mode having the intra prediction index as a luma block collocated with the chroma blocks. The intra prediction index is a number the identifies the intra prediction mode. The use of DM may increase coding efficiency because the video encoder does not need to signal syntax elements to specify the intra prediction mode for the chroma blocks. Rather, the video encoder may only need to signal sufficient syntax elements for the video decoder to determine the intra prediction mode of the collocated luma block.

The human eye is typically more sensitive to differences in luma values than to differences in chroma values. Hence, in some instances, the chroma values of a block may be subsampled relative to the luma values of the same block. For example, when the picture is encoded using the 4:2:2 chroma sampling format, a chroma sample is encoded only for every other luma sample in a row of samples. Thus, in the 4:2:2 chroma sampling format, a block of chroma samples has ½ the width of the corresponding block of luma samples. Hence, when a luma block is square, the collocated chroma blocks are non-square when the picture is encoded using the 4:2:2 chroma sampling format. When the luma block is non-square, the collocated chroma blocks may be square or non-square.

Specific technical issues may arise when a picture is encoded using the 4:2:2 chroma sampling format and DM mode is used for intra prediction. For instance, as described in an example above, the intra prediction mode 66 may correspond to a direction that is 45° clockwise from vertical in a square block but corresponds to a direction that is beyond −135° when the height of a block is greater than the width of the block. This is nearly the opposite direction. Thus, if the video encoder were to signal use of intra prediction mode 66 for a luma block and use DM mode, the collocated chroma blocks would be intra predicted using a very different direction than the luma block. Hence, use of DM mode is unlikely to lead to coding efficiencies in pictures that are encoded using the 4:2:2 chroma sampling format.

This disclosure describes techniques that may address technical issues associated with using the 4:2:2 chroma sampling format and DM mode. For example, a video coder (e.g., a video encoder or a video decoder) may select a set of wide-angle intra prediction directions based on a size of a luma block of a picture having a YUV 4:2:2 chroma sampling format. The intra prediction directions are directions corresponding to directional intra prediction modes. Additionally, the video coder may determine an intra prediction direction for the luma block. In this example, the intra prediction direction for the luma block is in the set of wide-angle intra prediction directions. The video coder may determine an intra prediction direction for a chroma block that is collocated in the picture with the luma block. In this example, the chroma block has a different width/height ratio than the luma block. In accordance with one or more techniques of this disclosure, the intra prediction direction for the chroma block is guaranteed to have the intra prediction direction for the luma block.

Because the intra prediction direction for the chroma block is guaranteed to have the intra prediction direction for the luma block, the intra prediction direction for the chroma block is consistent with the intra prediction direction for the luma block. Thus, the situation in which the same index of the intra prediction direction for the luma block indicates a very different intra prediction direction for the chroma block is avoided and use of DM mode may be maintained when the YUV 4:2:2 chroma sampling format is used and the luma and chroma blocks have different width/height ratios. Thus, signaling of a separate intra prediction mode for the chroma block may be avoided, which may improve coding efficiency.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, mobile devices (e.g., telephone handsets such smartphones), televisions, cameras, broadcast receiver devices, display devices, digital media players, video gaming consoles, video streaming devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for chroma intra prediction modes for chroma sampling formats in video codecs. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques of this disclosure intra prediction of chroma block for specific chroma sampling formats in video codecs. Source device 102 and destination device 116 are merely examples of such coding devices in which source device 102 generates encoded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 include video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for encoding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., encoded video data output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, computer-readable medium 110 may include storage device 112. Source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, computer-readable medium 110 may include file server 114 or another intermediate storage device that may store the encoded video data generated by source device 102. Source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A draft of the VVC standard is described in Bross, et al. "Versatile Video Coding (Draft 4)," Joint Video Experts Team (JVET) of ITU-T SG 16 WP 3 and ISO/IEC JTC 1/SC 29/WG 11, 13$^{th}$ Meeting: Marrakech, Mass., 9-18 Jan. 2019, JVET-M1001-v5 (hereinafter "VVC Draft 4"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication. Discussion in this disclosure or CTUs may also apply to superblocks or other types of blocks that serve in roles similar to CTUs.

As another example, video encoder 200 and video decoder 300 may be configured to operate according to VVC. According to VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU has 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter prediction or intra prediction. Inter prediction generally refers to predicting the CU from data of a previously coded picture, whereas intra prediction generally refers to predicting the CU from previously coded data of the same picture. To perform inter prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra prediction, video encoder 200 may select an intra prediction mode to generate the prediction block. Some examples of VVC provide sixty-seven intra prediction modes, including various directional modes, as well as planar mode and DC mode. In general, video encoder 200 selects an intra prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter prediction modes, video encoder 200 may encode data representing which of the various available inter prediction modes is used, as well as motion information for the corresponding mode. For uni-directional or bi-directional inter prediction, for example, video encoder 200 may encode motion vectors using advanced motion vector prediction (AMVP) or merge mode. Video encoder 200 may use similar modes to encode motion vectors for affine motion compensation mode.

Following prediction, such as intra prediction or inter prediction of a block, video encoder 200 may calculate residual data for the block. The residual data, such as a residual block, represents sample-by-sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning a picture into CTUs and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

Figure 2:
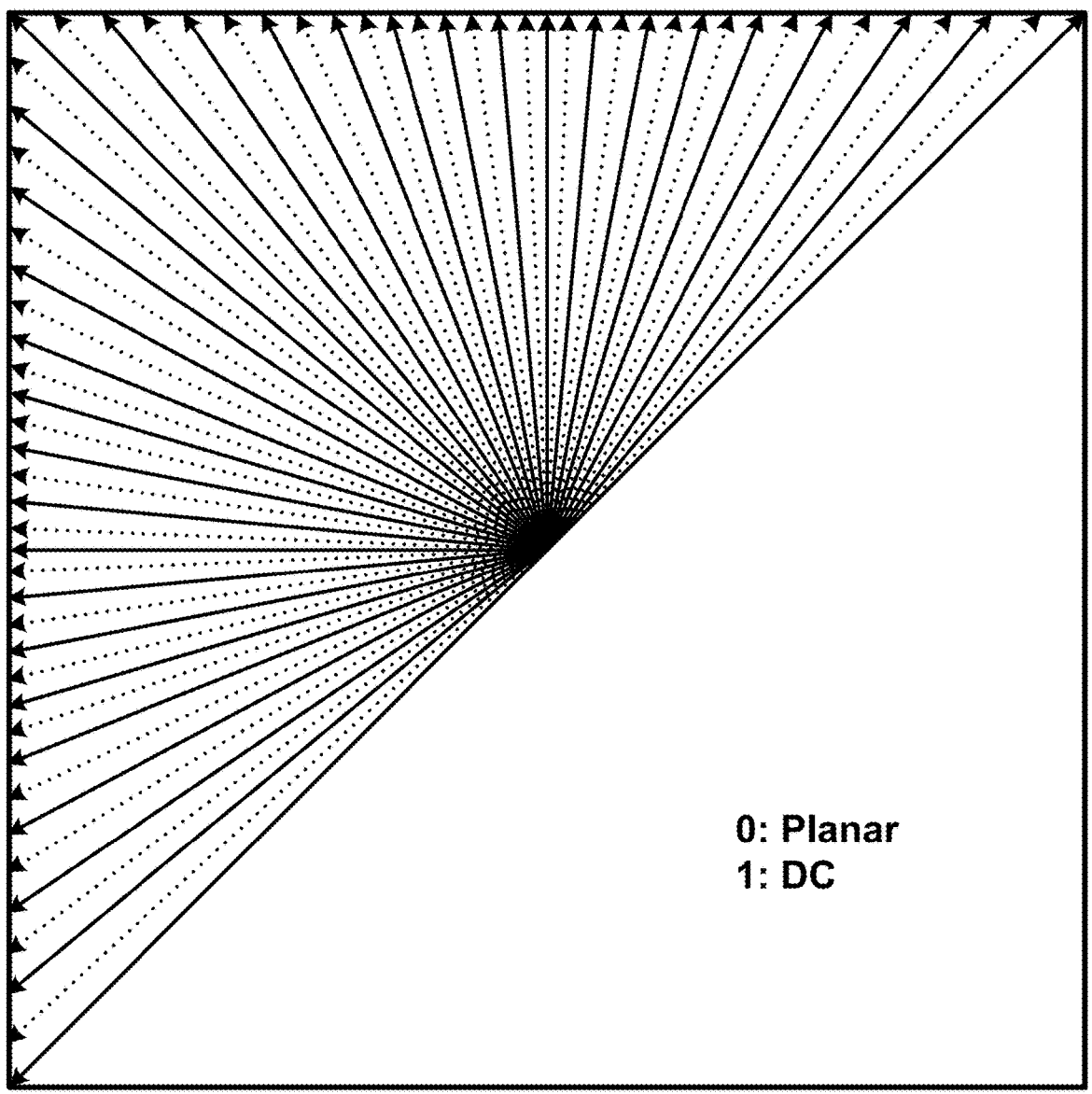
FIG. 2 is a conceptual diagram illustrating example intra prediction modes.

As briefly described above, video encoder 200 and video decoder 300 may use intra prediction to generate prediction blocks. FIG. 2 is a conceptual diagram illustrating example intra prediction modes. In one example of the VVC design, there are 67 intra prediction modes. As shown in FIG. 2, 65 of the intra prediction modes are directional modes and the other two are planar mode and DC mode. The directional modes use prediction directions that range from 45 degrees (i.e., toward the upper-right corner of a square block) to −135 degrees (i.e., toward the lower-left corner of a square block).

Figure 3:
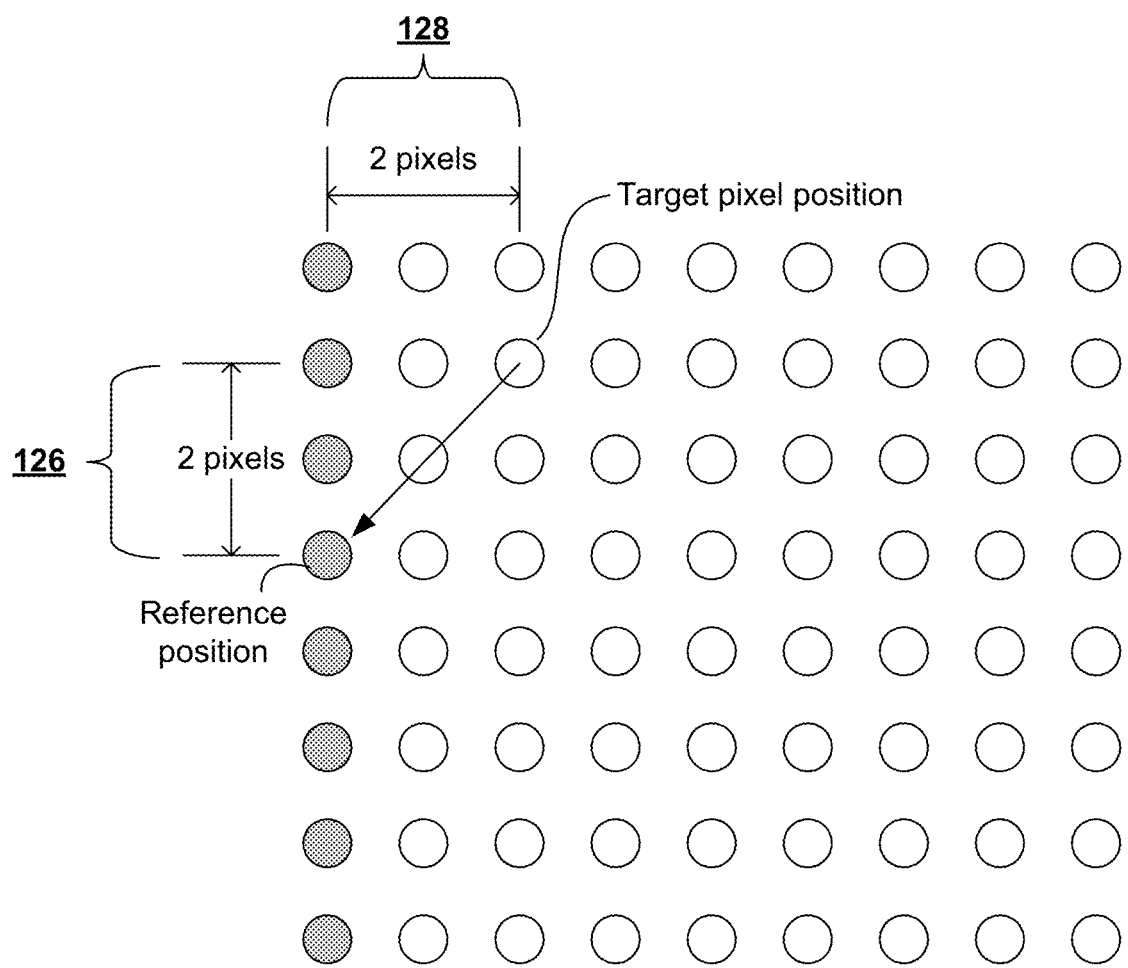
FIG. 3 is a conceptual diagram illustrating an example of intra prediction direction 2.

In VVC, the intra prediction angle is defined by the tangent value of the angle multiplied by 32. For example, FIG. 3 is a conceptual diagram illustrating an example of intra prediction direction 2. The tangent value may be defined as the vertical distance from a target pixel position to a reference position divided by the horizontal distance from the target pixel position to the reference position. The target pixel position is a position of a pixel being predicted. As shown in FIG. 3, for intra direction 2, the horizontal distance 126 and the vertical distance 128 between a target pixel position and its reference position are the same, so the tangent value (i.e., 2/2)*32=32. Thus, the angle of intra prediction direction (dir) 2 is defined as 32. The intra prediction direction may be denoted by "intraPredAngle."

Figure 4:
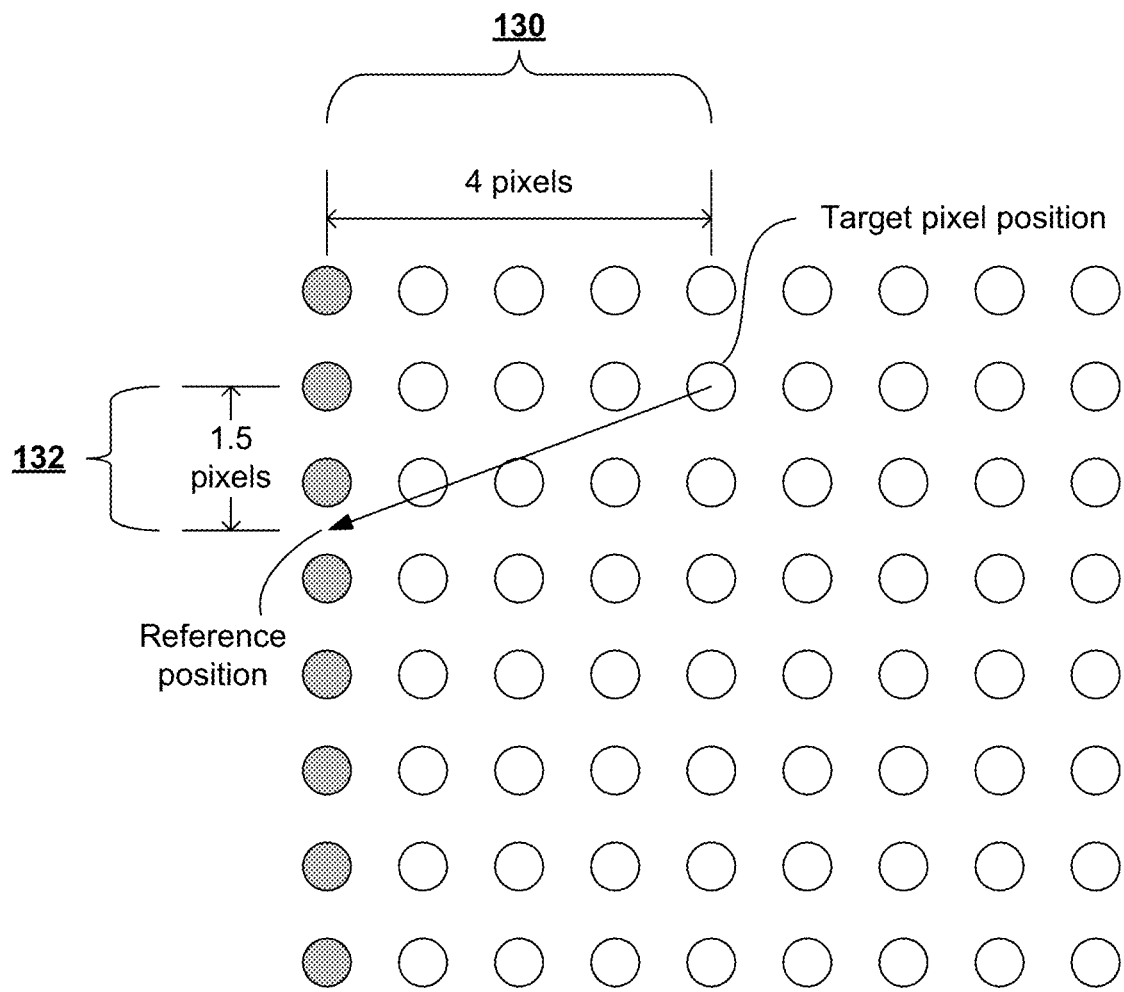
FIG. 4 is a conceptual diagram illustrating an example of intra prediction direction 10.

FIG. 4 is a conceptual diagram illustrating an example of intra prediction direction 10. As shown in FIG. 4, for intra prediction direction 10, the reference position of the target pixel is as shown in FIG. 4, and the reference sample position of the target pixel has offsets of 1.5 pixels vertically and 4 pixels horizontally. In this case, the tangent of the prediction direction is 3/8. Thus, the angle is defined as 12 (i.e., 3/8*32=12). The angle values of each intra prediction direction defined in VVC are shown in FIG. 5. In other words, the table of FIG. 5 shows intraPredAngle, as defined in VVC.

Wide-angle intra prediction directions may be applied (e.g., by video encoder 200 and video decoder 300) to non-square blocks to improve coding efficiency. For a non-square block, instead of using all the directional intra prediction modes in a range from 45° to −135° (e.g., as shown in FIG. 2), some of the intra prediction directions are removed and some extra intra prediction directions are added. The newly added intra prediction directions make use of the intra prediction mode indexes of the removed intra prediction directions so that the total number of directional intra prediction modes that may be applied is kept unchanged.

Figure 6:
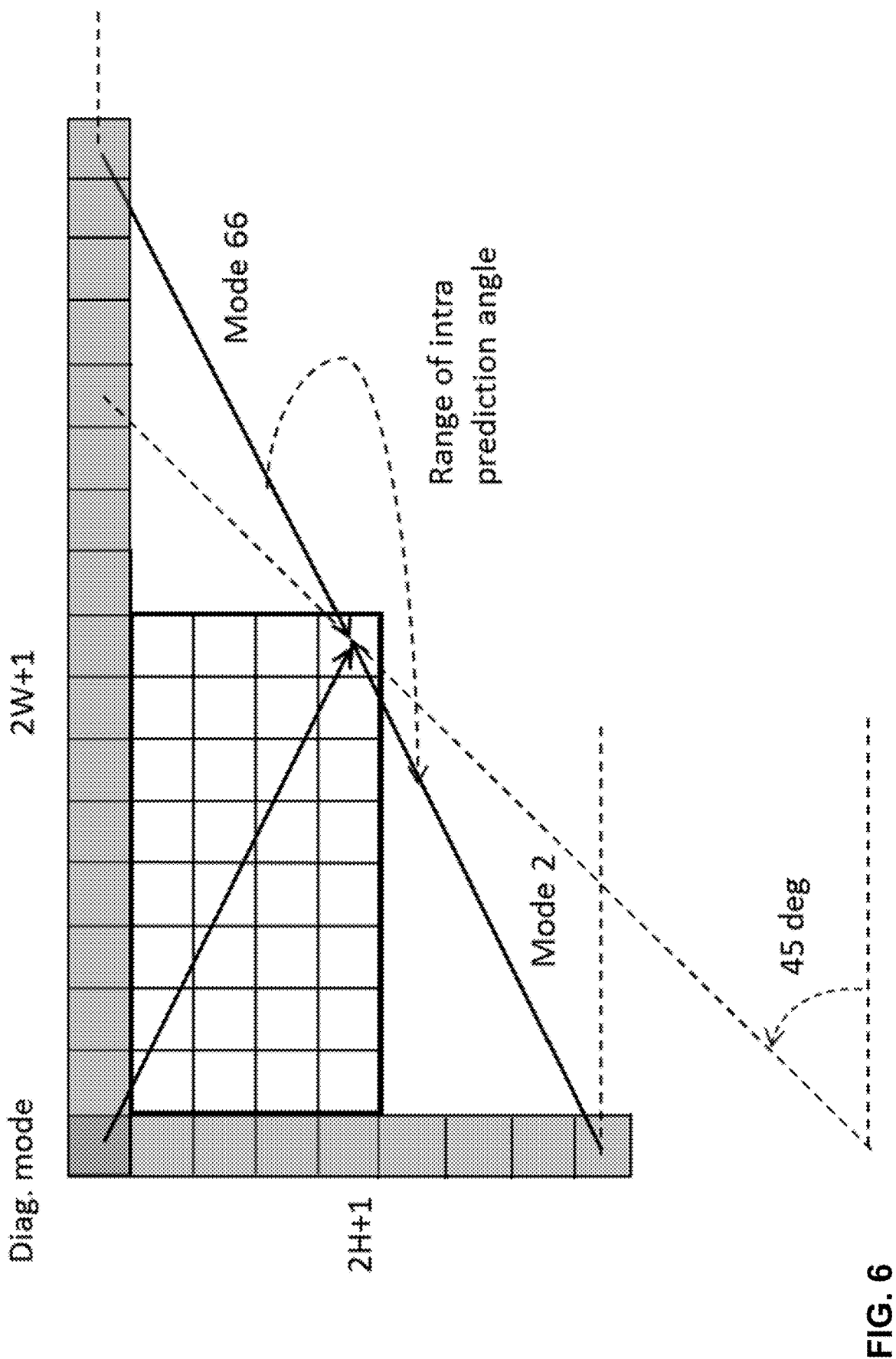
FIG. 6 is a conceptual diagram illustrating an example of wide-angle intra prediction.

For example, FIG. 6 is a conceptual diagram illustrating an example of wide-angle intra prediction. As shown in the example of FIG. 6, intra prediction mode 66 is not in the 65 directional intra prediction modes defined in FIG. 2. But for a block with width (w)/height (h)=2, as shown in FIG. 6, intra prediction mode 66 is added to the intra prediction mode list. At the same time, intra prediction mode 2 shown in FIG. 6 is removed and intra prediction mode 66 uses the index of intra prediction mode 2 for encoding in the bitstream. In other words, the index of 2 is reused to indicate intra prediction mode 66 instead of indicating the intra prediction mode that previously corresponded to the index of 2. Thus, as shown in FIG. 6, instead of indicating a direction that is down and to the left, an index of 2 indicates a direction that is up and to the right.

Position dependent intra prediction combination (PDPC) is a mode that combines each pixel of an intra prediction block with a few intra reference samples in a weighted average way. The samples involved in the combination are derived based on the position of each pixel to be combined.

Figure 7:
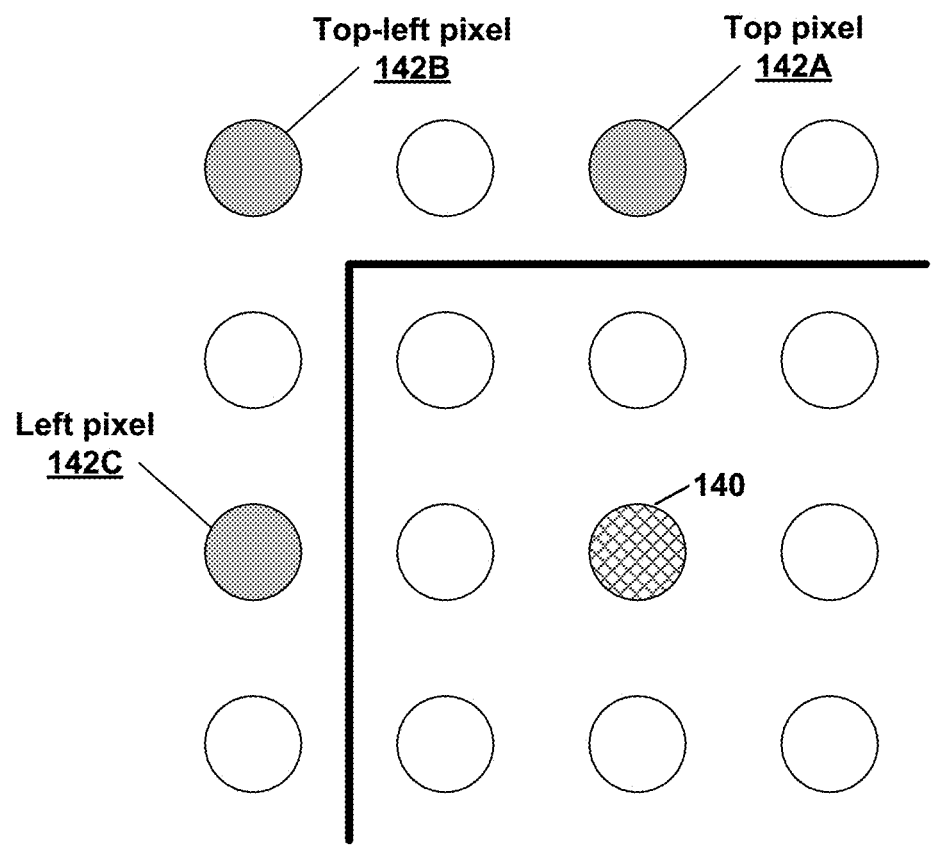
FIG. 7 is a conceptual diagram illustrating an example of position-dependent intra prediction combination (PDPC).

FIG. 7 is a conceptual diagram illustrating an example of PDPC. In the example of FIG. 7, circles represent pixels. A pixel 140, which is differentiated from other pixels in FIG. 7 by being filled with crosshatching, is a prediction value of a regular, non-PDPC, intra mode and the reference samples 142A, 142B, and 142C (which are differentiated from other pixels in FIG. 7 by being filled with gray) are the top, left, and top-left intra reference pixels. A final prediction sample value for the crosshatched pixel (i.e., pixel 140) is obtained by a weighted averaging of the regular intra prediction value of pixel 140 and values of the top, left and top-left reference samples 142A, 142B, and 142C. The weights used for weighted-average calculation are related to distances between the top, left and top-left samples and the target pixel (i.e., pixel 140).

YUV format is widely used in video and image processing. The Y component (i.e., the luma component) and the UV components (i.e., the chroma components) may have different sample rates. The UV components may be Cb and Cr chroma components, Co and Cg chroma components, or other types of chroma components. In the format of YUV 4:2:2, the sampling positions of luma samples and chroma samples are shown in the following picture. The horizontal resolution of chroma is halved compared to luma and vertical resolutions of chroma and luma are the same.

Figure 8:
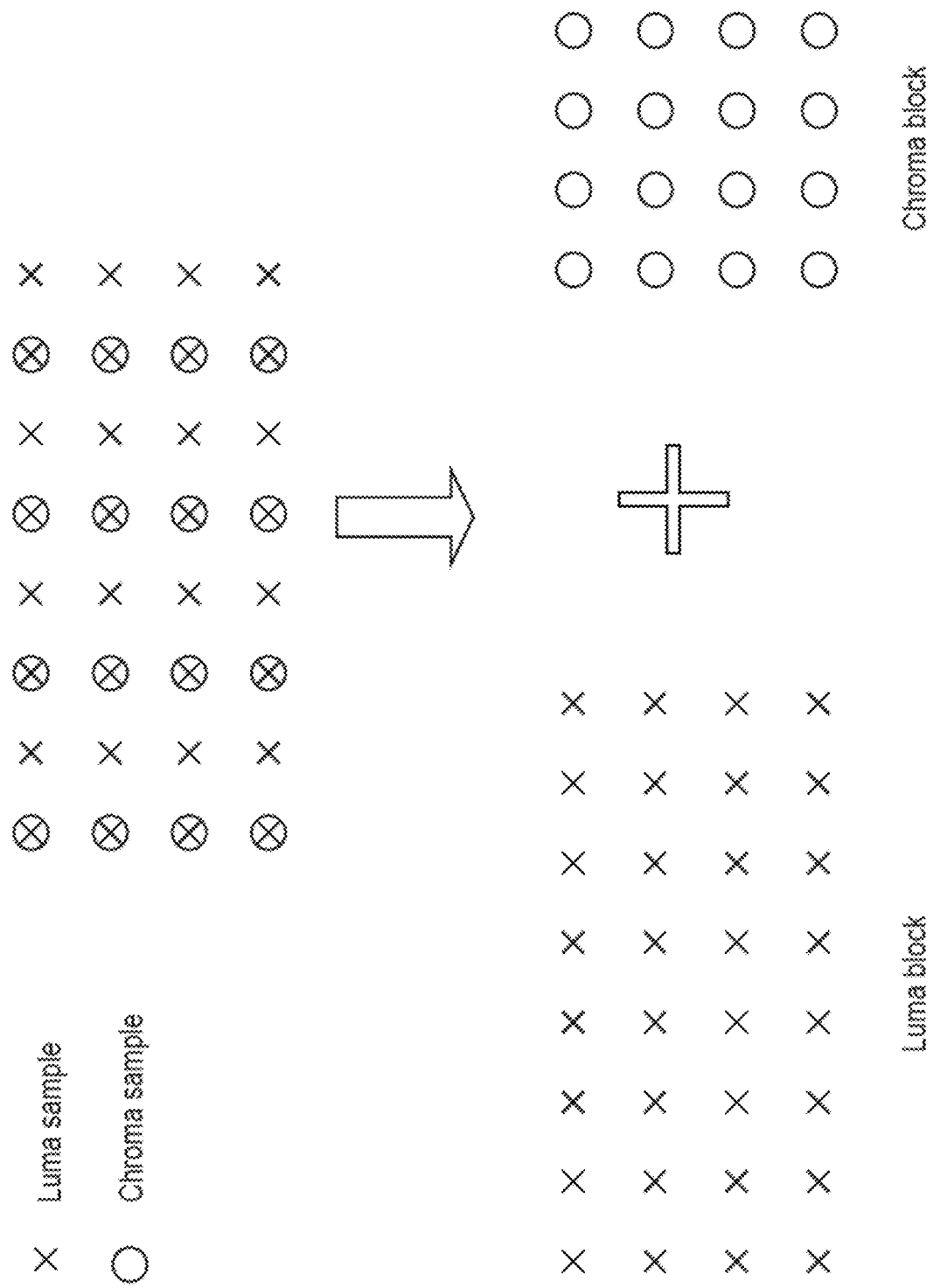
FIG. 8 is a conceptual diagram illustrating an example 4:2:2 chroma sampling format.

FIG. 8 is a conceptual diagram illustrating an example 4:2:2 chroma sampling format. As shown in FIG. 8, in the case of YUV 4:2:2, the luma block and collocated chroma blocks of the luma block have a different width/height ratios. In some examples, a luma block may be collocated with a chroma block if the luma block is in the same picture as the chroma block and includes a sample that is collocated with a center of the chroma block. In other examples, a luma block may be collocated with a chroma block if the luma block is in the same picture as the chroma block and includes a sample that is collocated with a top-left corner of the chroma block or other position within the chroma block.

Different chroma sampling formats have different ratios of sample frequencies between color components. The vertical and horizontal sample frequency ratios are denoted as $Ratio_{ver}$ and $Ratio_{hor}$ in this document. For example:

For YUV 4:2:0 format, the chroma components have half of the sample frequency as the luma component both vertically and horizontally. In this case, $Ratio_{ver}=Ratio_{hor}=2$.

For YUV 4:4:4 format, the chroma components have the same sample frequency as the luma component both vertically and horizontally. In this case, $Ratio_{ver}=Ratio_{hor}=1$.

In the case of YUV 4:2:2, the chroma components have half of the sample frequency as the luma component horizontally and have the same sample frequency as luma vertically. In this case, $Ratio_{ver}=1$ and $Ratio_{hor}=2$.

As mentioned above, for the chroma sampling format of YUV 4:2:2, a luma block has a different width/height ratio from a collocated chroma block of the luma block. In the current VVC design, wide-angle intra prediction directions are derived based width/height ratio. Ratios ranging from 1:16 and 16:1 are defined. However, for a luma block with the width/height ratio of 1:16, the width/height ratio of the collocated chroma block is 1:32, but the wide-angle intra prediction directions for 1:32 are not defined in VVC.

Figure 9B:
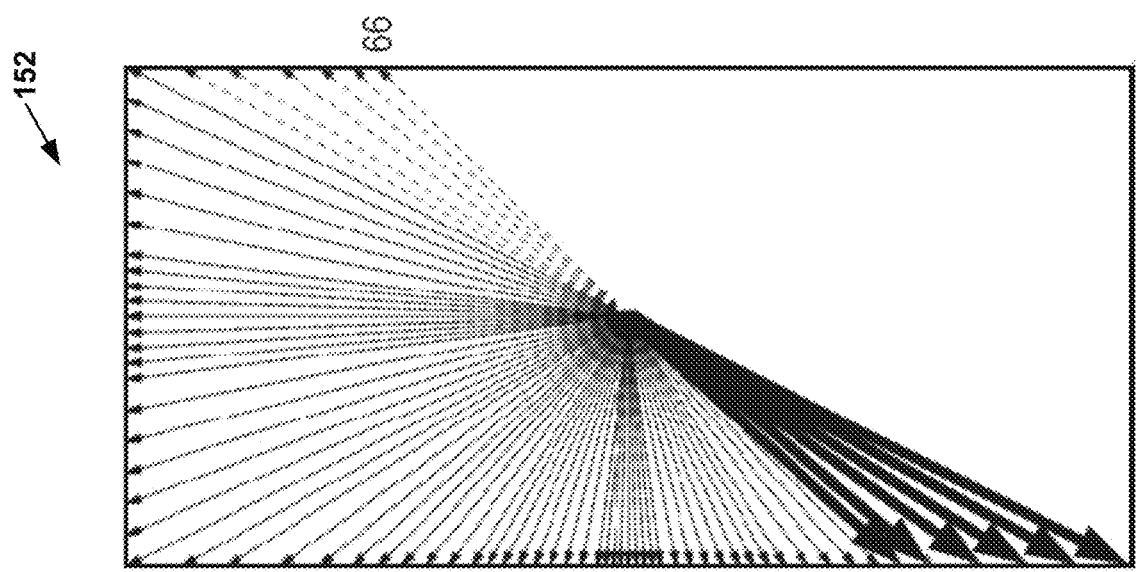
FIG. 9A and FIG. 9B are conceptual diagrams illustrating example intra directions of a square luma block and a collocated chroma block of the luma block.
Figure 9A:
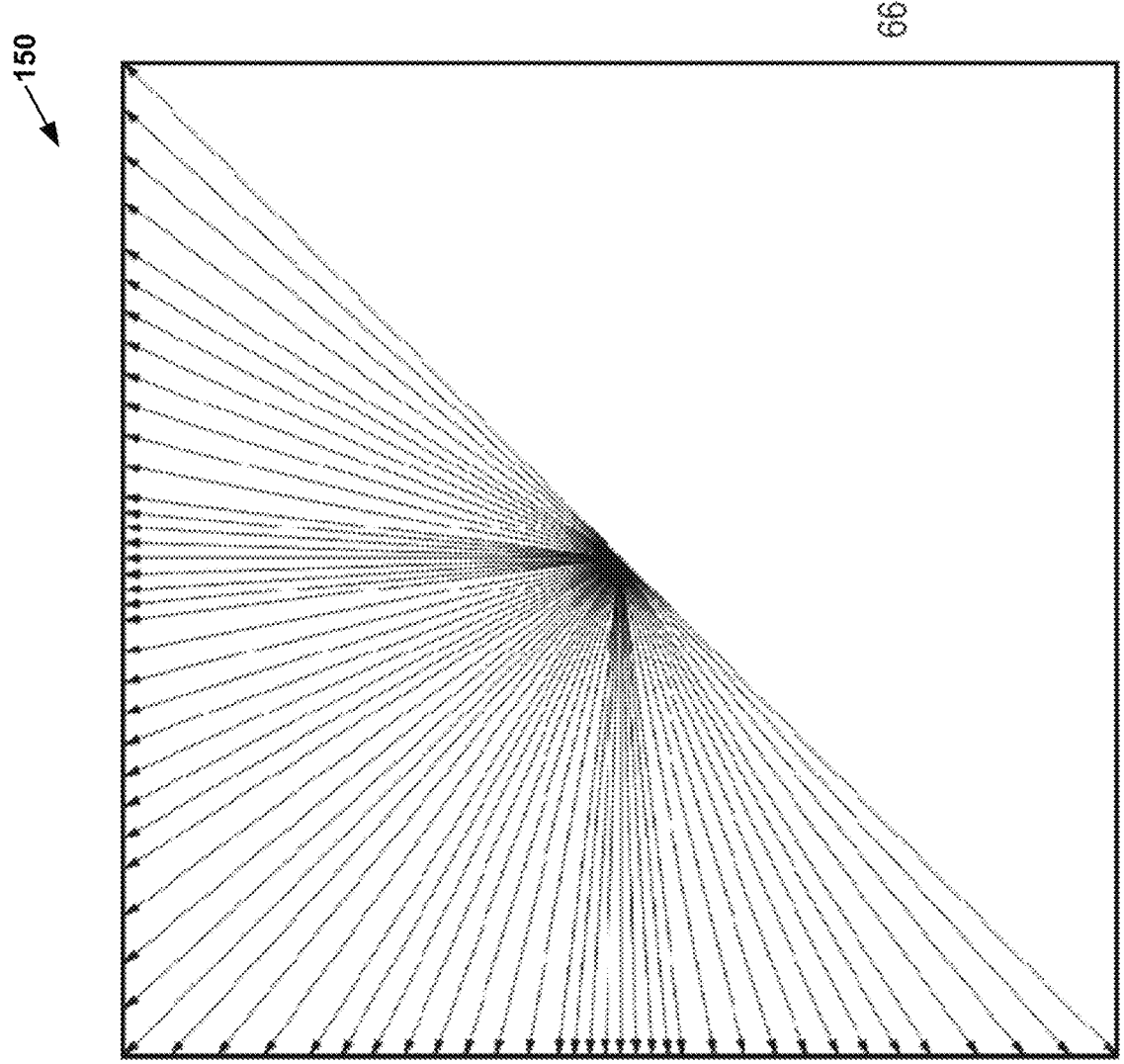

Additionally, as mentioned above, for the chroma sampling format of YUV 4:2:2, a luma block has a different width/height ratio from a collocated chroma block of the luma block. According to the definition of wide-angle intra prediction provided above, different width/height ratios have different sets of wide-angle intra prediction modes. For example, as shown in FIG. 9A and FIG. 9B, for a square luma block 150, its collocated chroma block 152 uses different directions. FIG. 9A shows intra directions of a square luma block 150. FIG. 9B shows a collocated chroma block of the square luma block 150. In FIG. 9B, the black arrows shown in chroma block 152 show the common directions between luma block 150 and chroma block 152. In FIG. 9B, the dashed arrows represent the directions that are not used for the block size of chroma block 152, and the indexes of those dashed arrows are assigned to the extra directions assigned to the block size (represented by the heavy arrows). Thus, FIG. 9B shows the directions corresponding to the intra prediction modes available when using a "derive-from" block size (i.e., the block size of the chroma block).

Direct mode (DM) is a mode in which video encoder 200 and video decoder 300 assume that an intra prediction mode to be used for a chroma block is the same as an intra prediction mode to be used for a collocated luma block. DM may be advantageous in some situations because DM may avoid the need for video encoder 200 to explicitly signal an intra prediction mode for the chroma block in addition to explicitly signaling an intra prediction mode for the collocated luma block. For instance, if video encoder 200 selected intra prediction mode 66 for the luma block 150, video encoder 200 and video decoder 300 use intra prediction mode 66 as DM mode for the chroma block 152. But because the chroma sampling format is YUV 4:2:2 in the example of FIG. 9B, intra prediction mode 66 is mapped to intra prediction mode 66'. FIG. 9B shows that intra prediction mode 66 and intra prediction mode 66' are nearly opposite in their direction and thus the DM mode may not be a good candidate for intra prediction of chroma block 152. Thus, a technical problem may arise in that coding efficiency may be diminished because DM mode could not be used in such circumstances and video encoder 200 may instead have to explicitly signal an intra prediction mode for the chroma block.

This disclosure describes techniques that may address one or more of the issues described above, and thereby may potentially increase coding efficiency. To address the issues associated with wide-angle DM mode mapping from one color component to another, a first solution proposed in this disclosure is to determine the set of wide-angle intra prediction directions based on a derive-from block size instead of a derive-to block size. In this disclosure, the "derive-from block size" refers to the height and width of the "derive-from" block. The "derive-from" block may be a luma block of a CU, PU, or other type of block.

For example, in accordance with a technique of this disclosure, for the YUV 4:2:2 chroma sampling format, although a chroma block has a different width/height ratio than its collocated luma block size, the intra prediction directions are selected based on a luma block size for the chroma block. In other words, the intra prediction modes available for use in the chroma block correspond to the same directions as the intra prediction modes available in a block having the size of the collocated luma block (i.e., the "derive-from" block size). Thus, in this example, it is guaranteed that the DM mode of a chroma block always has the same prediction direction as the collocated luma block. In other words, the intra prediction direction for the chroma block is guaranteed to have the intra prediction direction for the luma block.

Figure 10:
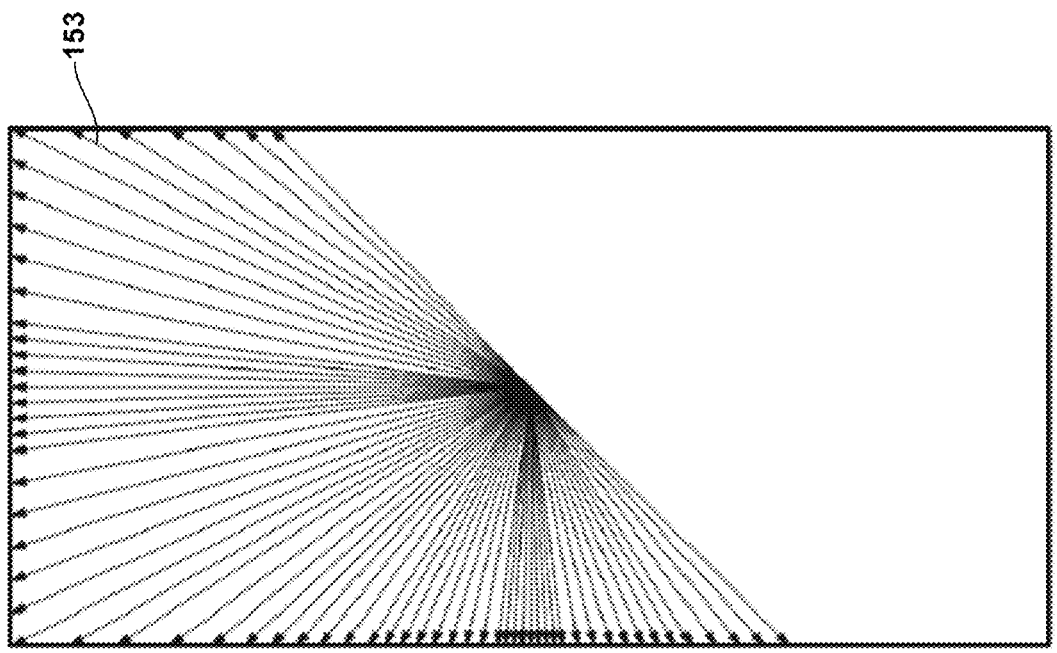
FIG. 10 is a conceptual diagram illustrating an example of determining intra prediction angles based on a luma block size for 4:2:2.
Figure 10:
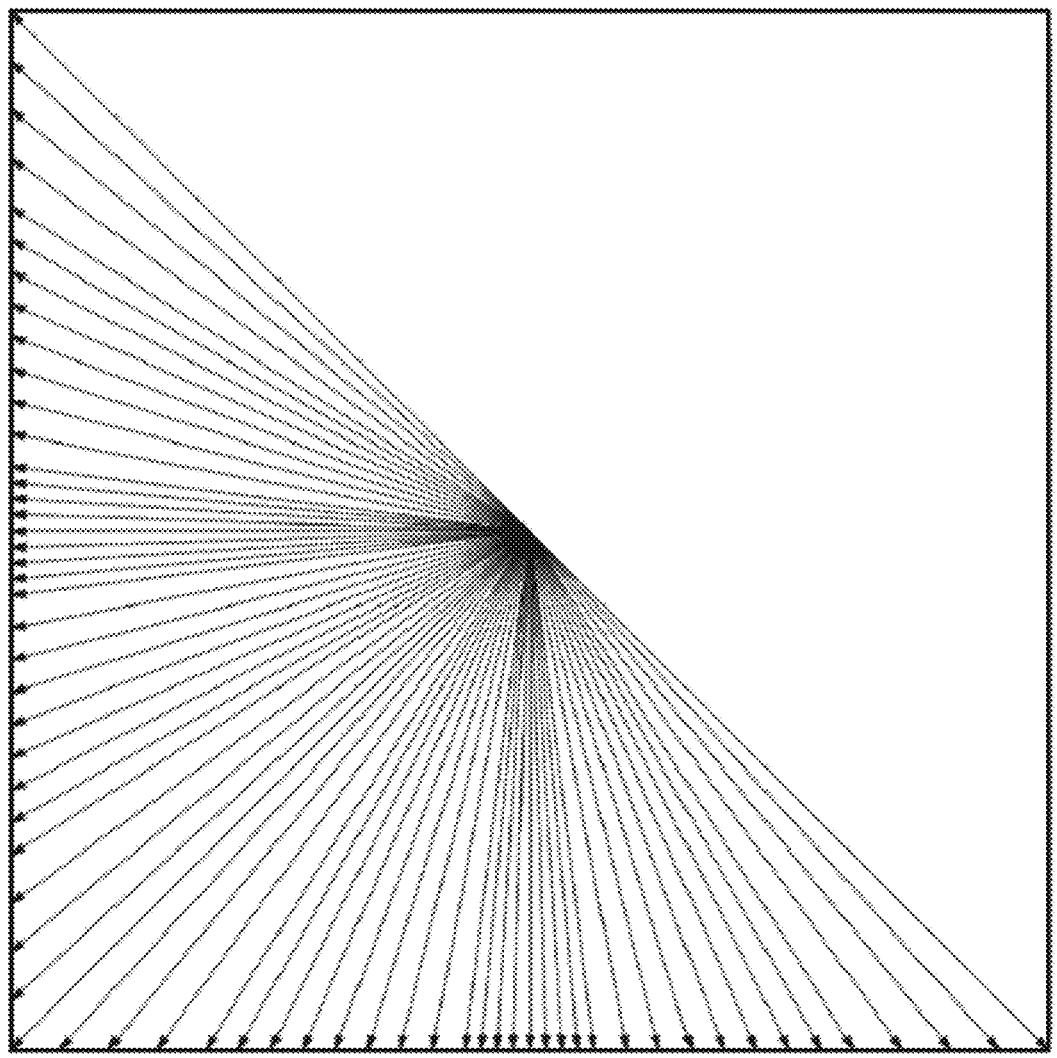

FIG. 10 shows the intra prediction directions of a square luma block and a collocated chroma block designed based on the current VVC wide-angle intra prediction. In the example of FIG. 10, the luma block is shown on the left and the chroma block is shown on the right. Instead of using intra prediction mode 66, wide-angle directions are defined for a block with width/height ratio of 1/2. The direction of intra prediction mode 66 (153) defined for a square block is used for this chroma block.

Thus, in accordance with one or more techniques of this disclosure, a video coder (e.g., video encoder 200 or video decoder 300) may select a set of wide-angle intra prediction directions based on a size of a luma block of a picture having a YUV 4:2:2 chroma sampling format. Additionally, the video coder may determine an intra prediction direction for the luma block. The intra prediction direction for the luma block may be in the set of wide-angle intra prediction directions. Furthermore, the video coder may determine an intra prediction direction for a chroma block. The luma block is collocated in the picture with the chroma block, the chroma block has a different width/height ratio than the luma block, and the intra prediction direction for the chroma block is guaranteed to have the intra prediction direction for the luma block. Because the intra prediction direction for the chroma block is guaranteed to have the intra prediction direction for the luma block, the intra prediction direction for the chroma block is consistent with the intra prediction direction for the luma block. For this reason, DM mode may continue to be used for the chroma block, thereby avoiding the need to indicate an intra prediction mode for the chroma block separately from the intra prediction mode of the luma block.

In some examples of this disclosure, to address issues associated with wide-angle DM mode mapping from one color component to another, this disclosure proposes solutions to define mappings between intra prediction angles (including wide-angle intra prediction directions) of different color components and to use the mapping when the intra mode information of another color component (i.e., the "derive-from" component) is used for the current color component (i.e., the "derive-to" component). The intra mode information for a color component may include an index of an intra prediction mode for the color component.

For example, in VVC for the YUV format, for each chroma block, the intra prediction mode information (i.e., the luma mode information) of the collocated luma block of the chroma block is available. According to this disclosure, the luma mode information of the collocated luma block can be mapped (e.g., by video encoder 200 and video decoder 300) to a chroma mode (i.e., an intra prediction mode usable in the chroma block) and the mapped mode can be used for encoding and decoding the chroma block. Thus, DM mode may continue to be used for the chroma block, thereby avoiding the need to separately signal an intra prediction mode for the chroma block.

Examples of using the mapped mode to encode and decode the chroma block are as follows. In a first example, the mapped mode may be used (e.g., by video encoder 200 and video decoder 300) to replace one or more existing intra prediction mode(s) in the chroma intra prediction mode candidates. For instance, the 'DM mode' in VVC may be replaced by the current method of this disclosure. Thus, when coding a chroma block in a picture having a YUV 4:2:2 chroma sampling format where the chroma block has a different width/height ratio than a collocated luma block, a video coder (e.g., video encoder 200 or video decoder 300) may determine a chroma intra prediction mode that is mapped to the intra prediction mode of the collocated luma block. The video coder may then use the determined chroma intra prediction mode to generate a prediction block for the chroma block.

In a second example of using the mapped mode to encode and decode the chroma block, the mapped mode may be used (e.g., by video encoder 200 and video decoder 300) as an additional mode on top of (i.e., in addition to) the current intra prediction mode list of the chroma block. In other words, a video coder may determine a set of intra prediction directions for the chroma block based on the size of the chroma block and then add mapped modes to the resulting list of intra prediction directions. Thus, the list of intra prediction directions that the video coder can use to generate the prediction block for the chroma block may be greater than 65.

In some examples, if the derive-to component and the derive-from component have exactly the same set of possible intra prediction directions, the definition of the mapping can be straightforward. For example, for YUV 4:4:4, YUV 4:2:0, etc., the sample frequency ratios $Ratio_{hor}=Ratio_{ver}=1$ according to the definition of the current VVC draft, the luma and chroma components are using exactly the same set of intra prediction angles (including wide-angles). Each derive-from intra prediction angle can be mapped (e.g., by video encoder 200 and video decoder 300) to a derive-to intra prediction angle of the same value.

On the other hand, if the derive-to component and the derive-from component do not have exactly the same set of possible intra prediction directions, it is proposed in this disclosure that video encoder 200 and video decoder 300 map each intra prediction direction of the derive-from component to derive-to components by scaling the intra prediction angles of the derive-from component based on $Ratio_{hor}$ and $Ratio_{ver}$. Rounding of the prediction direction may be applied (e.g., by video encoder 200 and video decoder 300) if needed and the precision of the prediction angle may be increased to lower or completely remove the error introduced by rounding.

As an example of scaling the intra prediction angles of the derive-from component, when mapping a horizontal derive-from intra prediction direction to a chroma intra prediction direction, the angle value of the derive-from angle value may be multiplied by $$\frac{Ratio_{hor}}{Ratio_{ver}}.$$

A horizontal derive-from intra prediction direction is a direction less than −45° from vertical. When mapping a vertical derive-from intra prediction direction to chroma, the derive-from angle value may be multiplied by $$\frac{Ratio_{ver}}{Ratio_{hor}}.$$

A vertical derive-from intra prediction direction is a direction greater than −45° from vertical. Video encoder 200 and video decoder 300 may apply rounding and may increase the precision of angle values.

Based on the mapping between derive-from and derive-to intra angles, the different methods of intra prediction can be designed for the derive-to components. The following are a few examples for the format of YUV 4:2:2 on top of the current VVC design.

In a first example, the precision of prediction angle values is increased to 1/64-pixel precision from 1/32-pixel precision. Furthermore, to map a luma intra angle to a chroma intra angle, video encoder 200 and video decoder 300 may multiply the angle values of horizontal luma intra angles by $$\frac{Ratio_{hor}}{Ratio_{ver}}$$

and multiply the vertical luma intra angles values by $$\frac{Ratio_{ver}}{Ratio_{hor}}.$$

In this first example, video encoder 200 and video decoder 300 may use, for each chroma block collocated with the luma block, the mapped intra angle as the DM mode. In other words, if the chroma blocks collocated with the luma block is coded using DM mode, video encoder 200 and video decoder 300 may use an intra prediction mode corresponding to the mapped intra angle to generate a prediction block for the chroma block. Thus, if the luma mode (i.e., the intra prediction mode of the luma block) is denoted as $Angle_{luma}$, then for the corresponding chroma block, video encoder 200 and video decoder 300 may use the $Map_{chroma}(Angle_{luma})$ in the encoding process and decoding process of one or more of the collocated chroma blocks, e.g., as DM mode.

Figure 11B:
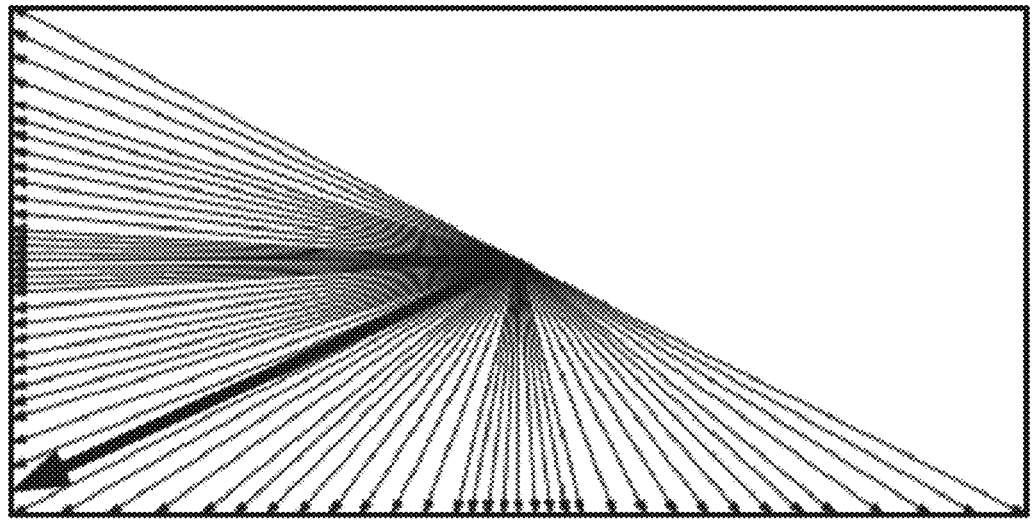
FIG. 11A and FIG. 11B are conceptual diagrams illustrating an example mapping of luma intra angles to chroma intra angles.
Figure 11A:
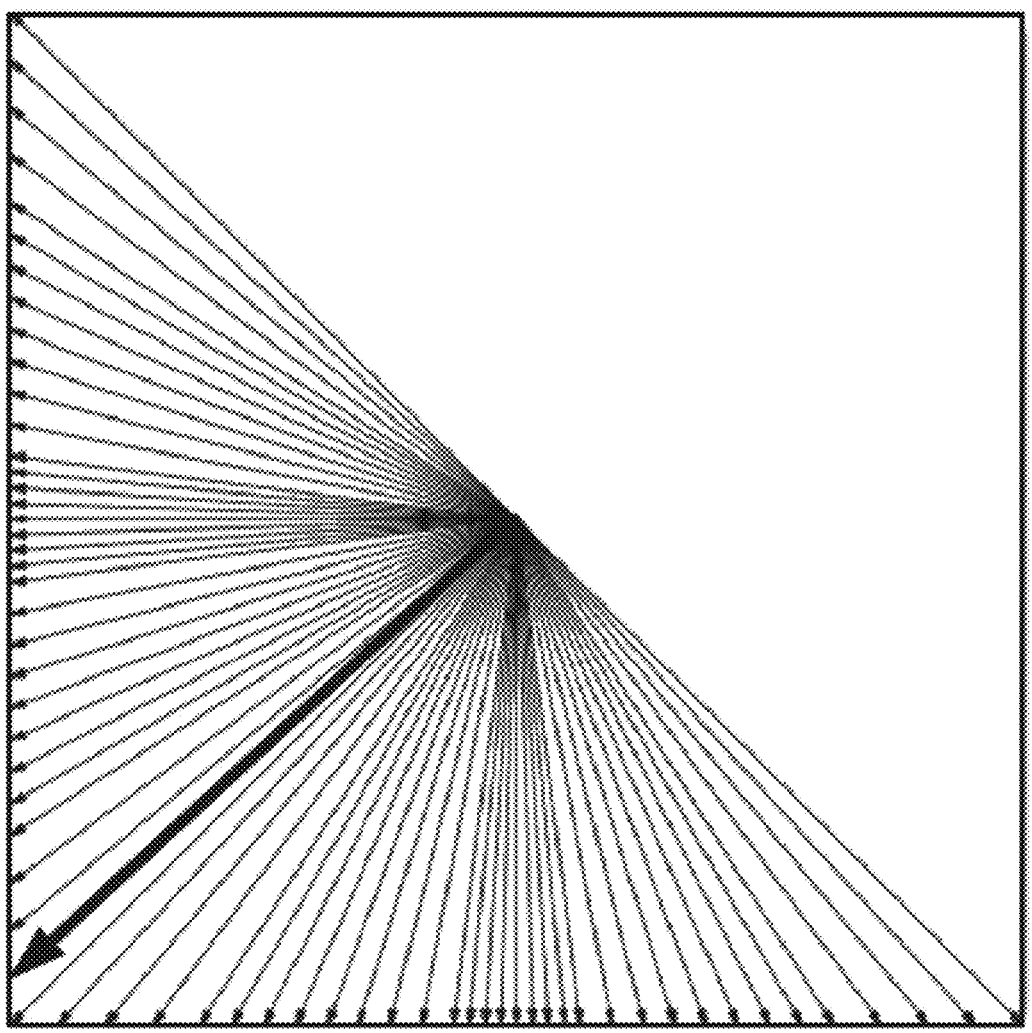

Consistent with this first example, FIG. 11A and FIG. 11B are conceptual diagrams illustrating an example mapping of prediction angles from a square luma block to its rectangular collocated chroma block. Specifically, in the example of FIG. 11A, an intra prediction mode having an angle of −29 is indicated with a thick arrow. As mentioned above, the angle may be defined by a tangent value*32. Multiplying the tangent value by 32 allows angles to be represented by integers instead of fractional values. Thus, a value of −58 may be used instead of −29 when video encoder 200 and video decoder 300 use 1/64-pixel precision.

In a second example, instead of increasing the precision of prediction angle values as in the first example, the precision of intra prediction angles are kept unchanged. When mapping a luma intra angle to chroma, same as in the first example, fractional angle values may be derived when multiplying an intra angle by $$\frac{1}{2}\left(\frac{Ratio_{ver}}{Ratio_{hor}} = \frac{1}{2}\right).$$

In this example, fractional angle values are rounded to nearby integer values. Different types of rounding can be applied. Video encoder 200 and video decoder 300 may use the set of mapped chroma angles as the candidates of the chroma prediction angles and may use the map to derive the 'map-to' mode. So, if luma uses $Angle_{luma}$, then for the corresponding chroma block, video encoder 200 and video decoder 300 use the $Map_{chroma}(Angle_{luma})$. For example, $Map_{chroma}(Angle_{luma})$ can be used as DM mode.

In the first example and the second example above, the derived chroma angles may be different from any angle that is defined for luma blocks. Thus, extra angles that are exclusive to chroma components may be introduced. In the following example (i.e., the third example), the rounding of mapped angles is designed in such a way that a candidate direction for a chroma block is always a possible angle value for a luma block.

In a third example, the scaling process described in the first example is performed first (e.g., by video encoder 200 and video decoder 300). As a second step, the scaled angle values are clipped (e.g., by video encoder 200 and video decoder 300) to the nearest angle values that are also defined as a possible angle value for luma blocks (including all the wide angles for different possible width/height ratios). The clipped angle is used in the encoding process (e.g., by video encoder 200) and the decoding process (e.g., by video decoder 300) of the chroma block, e.g., as DM mode.

Figure 12:
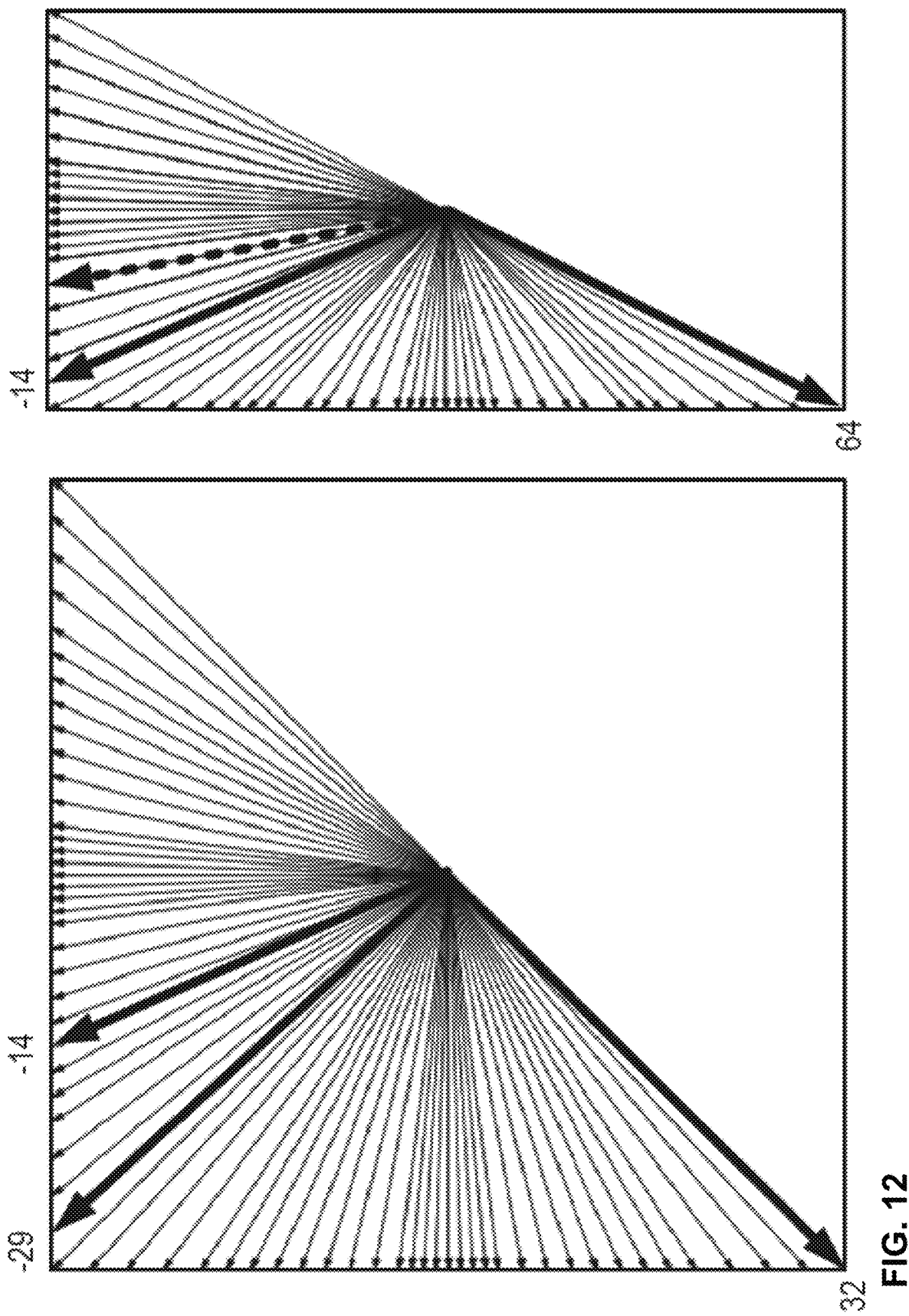
FIG. 12 is a conceptual diagram illustrating an example mapping of luma intra angles to chroma intra angles.

FIG. 12 shows the mapping of prediction angles from a square luma block to a rectangular collocated chroma block of the square luma block. In the example of FIG. 12, for the vertical luma intra angle −29, the scaled intra angle is −14.5, and its nearest angle value that is also a possible angle for luma block is −14; so the mapped chroma angle is −14. For the horizontal luma prediction angle 32, the scaled angle value is 64. Although 64 is not a possible luma intra angle for this square block, 64 is in the candidate set of wide-angle modes defined for luma blocks with width/height=½. So, the mapped chroma angle value is 64.

The method of mapping luma intra angles to chroma intra angles described in the three examples (i.e., Example 1, Example 2, and Example 3) above can be applied in a combined manner. A fourth example, described below, is one such design in which the three examples above are applied in a combined manner. In this fourth example, the scaling process described in the first example is performed firstly by video encoder 200 and video decoder 300. The output of the scaling process is denoted as $Angle_{scaled}$. When clipping the scaled angle, the range of possible intra angles are considered. Let $Angle_{lmin}$=the minimum value of all luma intra angles and let $Angle_{lmax}$ equal the maximum value of all intra angles. If the $Angle_{scaled} < Angle_{lmin}$ or $Angle_{scaled} > Angle_{lmax}$, then an extra angle is used. Otherwise, $Angle_{scaled}$ is clipped to the nearest angle value so that for the angle value, video encoder 200 and video decoder 300 can find a luma block size for which the angle value is a possible intra angle.

In this disclosure, it is proposed to take the distance of pixel sample positions into consideration when calculating distance between pixels. As an example, for the format of YUV 4:2:2, when video encoder 200 and video decoder 300 calculate the weights for position dependent intra prediction combination (PDPC) mode, the horizontal distance in number of pixels is multiplied by 2 when calculating the weights for the weighted average so that the weighted average is based on sample position distances instead of pixel number distances.

Figure 13:
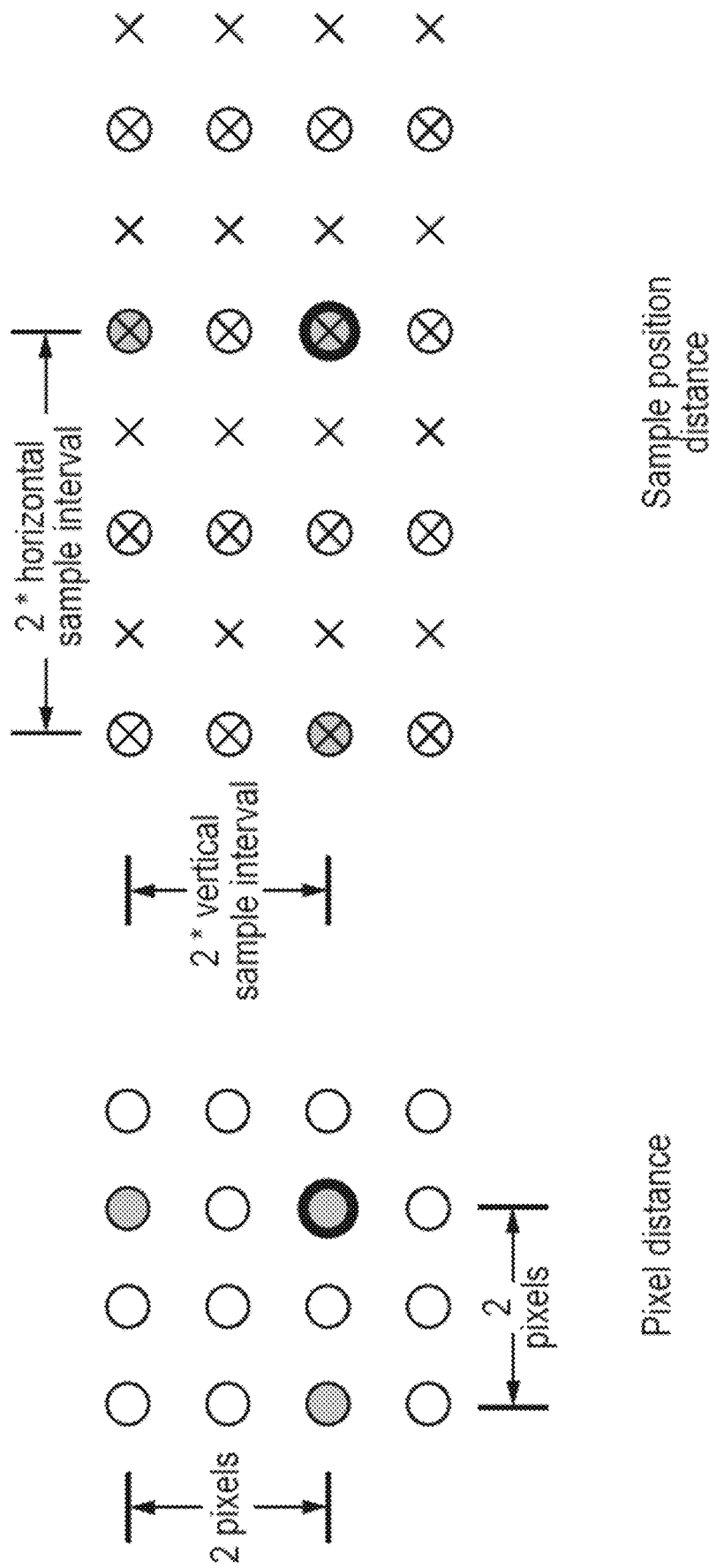
FIG. 13 is a conceptual diagram illustrating an example of pixel distance and sample position distance.

FIG. 13 shows the difference between distance in number of pixels and distance of sample positions. In the example of FIG. 13, circles correspond to chroma samples and X marks correspond to luma samples. In FIG. 13, the heavily outlined circle corresponds to a prediction sample and the gray-shaded circles that are not heavily outlined correspond to reference samples. For YUV 4:2:2 chroma sampling format, the horizontal sample interval of chroma samples is 2 times as long as the vertical sample interval; so a horizontal distance of 2 pixels is actually 2 times of a vertical distance of 2 pixels. Particularly, as shown in the left part of FIG. 13, the prediction sample is 2 pixels away from each of the reference samples in terms of chroma pixels. However, as shown in the right part of FIG. 13, the prediction sample is 4 pixels away from the left reference sample in terms of sample positions and 2 pixels away from the above reference sample in terms of sample positions.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 14A:
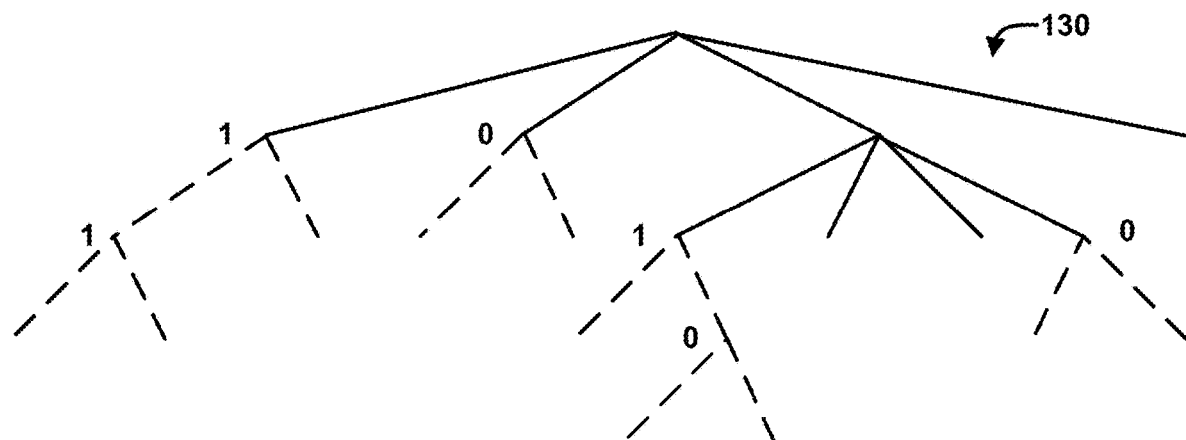
FIGS. 14A and 14B are conceptual diagrams illustrating an example quadtree binary tree (QTBT) structure, and a corresponding coding tree unit (CTU).
Figure 14B:
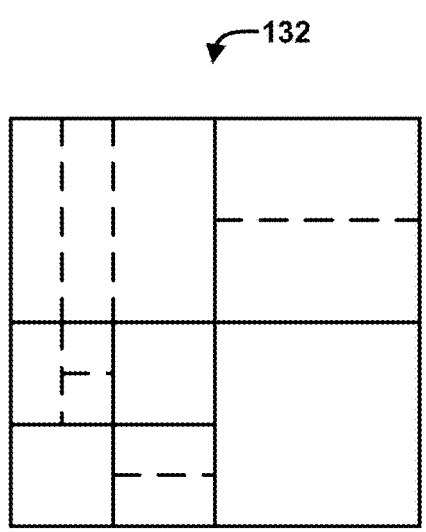

FIGS. 14A and 14B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level (i.e., the first level) of QTBT structure 130 (i.e., the solid lines) and syntax elements (such as splitting information) for a prediction tree level (i.e., the second level) of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 14B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, it will not be further split by the binary tree, since the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies that no further vertical splitting is permitted. Similarly, a binary tree node having a height equal to MinBTSize implies no further horizontal splitting is permitted for that binary tree node. As noted above, leaf nodes of the binary tree are referred to as CUs, and are further processed according to prediction and transform without further partitioning.

Figure 15:
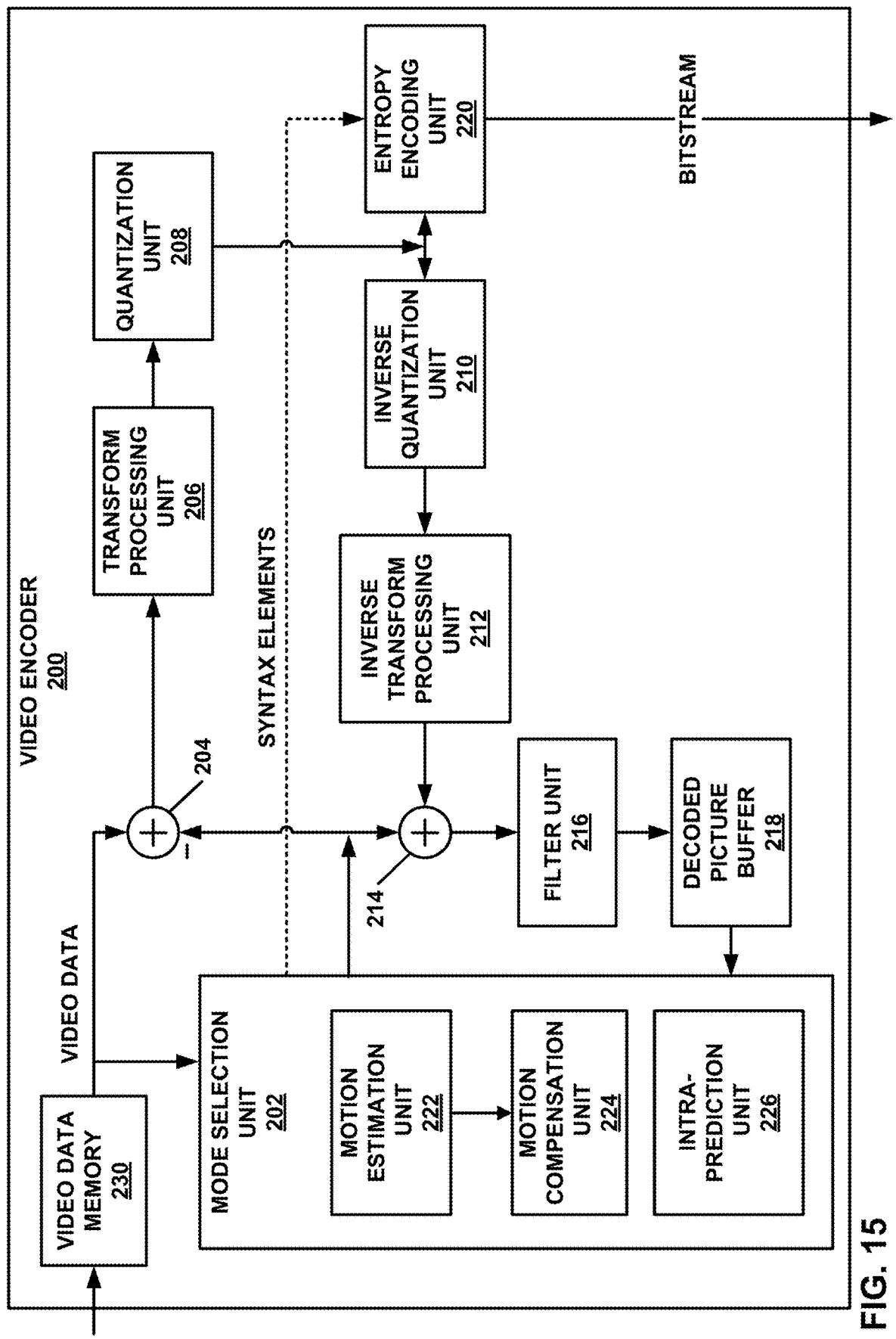
FIG. 15 is a block diagram illustrating an example video encoder that may perform the techniques of this disclosure.

FIG. 15 is a block diagram illustrating an example video encoder 200 that may perform the techniques of this disclosure. FIG. 15 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266/VVC video coding standard in development. However, the techniques of this disclosure are not limited to these video coding standards and are applicable generally to video encoding and decoding.

In the example of FIG. 15, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 15 are illustrated to assist with understanding the operations performed by video encoder 200. The units may be implemented as fixed-function circuits, programmable circuits, or a combination thereof. Fixed-function circuits refer to circuits that provide particular functionality and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra prediction, or intra prediction coding, intra-prediction unit 226 may generate the prediction block from samples neighboring the current block. For example, for directional intra prediction modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

In accordance with one or more techniques of this disclosure, intra-prediction unit 226 may select a set of wide-angle intra prediction directions based on a size of a luma block of a picture having a YUV 4:2:2 chroma sampling format. Additionally, intra-prediction unit 226 may determine an intra prediction direction for the luma block. The intra prediction direction for the luma block is in the set of wide-angle intra prediction directions. Furthermore, intra-prediction unit 226 may determine an intra prediction direction for a chroma block. The luma block is collocated in the picture with the chroma block, the chroma block has a different width/height ratio than the luma block, and the intra prediction direction for the chroma block is guaranteed to have the intra prediction direction for the luma block. Intra-prediction unit 226 may use the intra prediction direction for the luma block to generate a prediction block for the luma block. Additionally, intra-prediction unit 226 may use the intra prediction direction for the chroma block to generate a prediction block for the chroma block.

In some examples, intra-prediction unit 226 may determine an intra prediction mode based on a mapping between intra prediction angles of the first color component and the second color component. The second color component is different from the first color component. Furthermore, intra-prediction unit 226 may generate, based on the intra prediction mode, a prediction block for the second color component of the current block.

Furthermore, in examples where video encoder 200 uses the PDPC mode, intra-prediction unit 226 may determine a set of reference samples for a current sample of a current block of the video data that is formatted in YUV 4:2:2 mode. Additionally, intra-prediction unit 226 may determine weights for the reference samples. As part of determining the weights for the reference samples, intra-prediction unit 226 may multiply a horizontal distance in number of pixels of a reference sample by 2. Intra-prediction unit 226 may calculate, based on the weights, a weighted average of the reference samples. Additionally, intra-prediction unit 226 may include the weighted average of the reference samples in a predictive block for the current block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. Video encoder 200 and video decoder 300 may support CU sizes of 2N×2N, 2N×N, or N×2N.

For other video coding techniques such as intra-block copy mode coding, affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter predict blocks of subsequently encoded pictures. In addition, intra-prediction unit 226 may use reconstructed blocks in DPB 218 of a current picture to intra predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks unless otherwise specified. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

In this manner, in some samples, video encoder 200 represents an example of a video encoding device including a memory configured to store video data, and one or more processing units implemented in circuitry and configured to determine a set of wide-angle intra prediction directions based on a derive-from block size, the derive-from block size being a block size for a first color component of a current block of the video data; use a wide-angle intra prediction direction in the set of wide-angle intra prediction directions to generate a prediction block for a second color component of the current block of the video data, the second color component being different from the first color component; and encode the current block based on the prediction block.

In some examples, video encoder 200 represents an example of a video encoding including a memory configured to store video data, and one or more processing units implemented in circuitry and configured to select a set of wide-angle intra prediction directions based on a size of a luma block of a picture having a YUV 4:2:2 chroma sampling format; determine an intra prediction direction for the luma block, wherein the intra prediction direction for the luma block is in the set of wide-angle intra prediction directions; determine an intra prediction direction for a chroma block, wherein: the luma block is collocated in the picture with the chroma block, the chroma block has a different width/height ratio than the luma block, and the intra prediction direction for the chroma block is guaranteed to have the intra prediction direction for the luma block; use the intra prediction direction for the luma block to generate a prediction block for the luma block; use the intra prediction direction for the chroma block to generate a prediction block for the chroma block; encode the luma block based on the prediction block for the luma block; and encode the chroma block based on the prediction block for the chroma block.

In some examples, video encoder 200 represents an example of a video encoding device including a memory configured to store video data, and one or more processing units implemented in circuitry and configured to, based on an intra mode information of a first color component of a current block of the video data being used for a second color component of the current block, determine, based on a mapping between intra prediction angles of the first color component and the second color component, an intra prediction mode, the second color component being different from the first color component; generate, based on the intra prediction mode, a prediction block for the second color component of the current block; and encode the current block based on the prediction block.

In some examples, video encoder 200 represents an example of a video encoding device including a memory configured to store video data, and one or more processing units implemented in circuitry and configured to determine a set of reference samples for a current sample of a current block of the video data that is formatted in YUV 4:2:2 mode; determine weights for the reference samples, wherein determining the weights for the reference samples comprises multiplying a horizontal distance in number of pixels of a reference sample by 2; calculate, based on the weights, a weighted average of the reference samples; include the weighted average of the reference samples in a predictive block for the current block; and encode the current block based on the prediction block.

Encoding a block based on the prediction block may comprise subtracting samples of the prediction block from corresponding samples of the current block to generate residual data.

Figure 16:
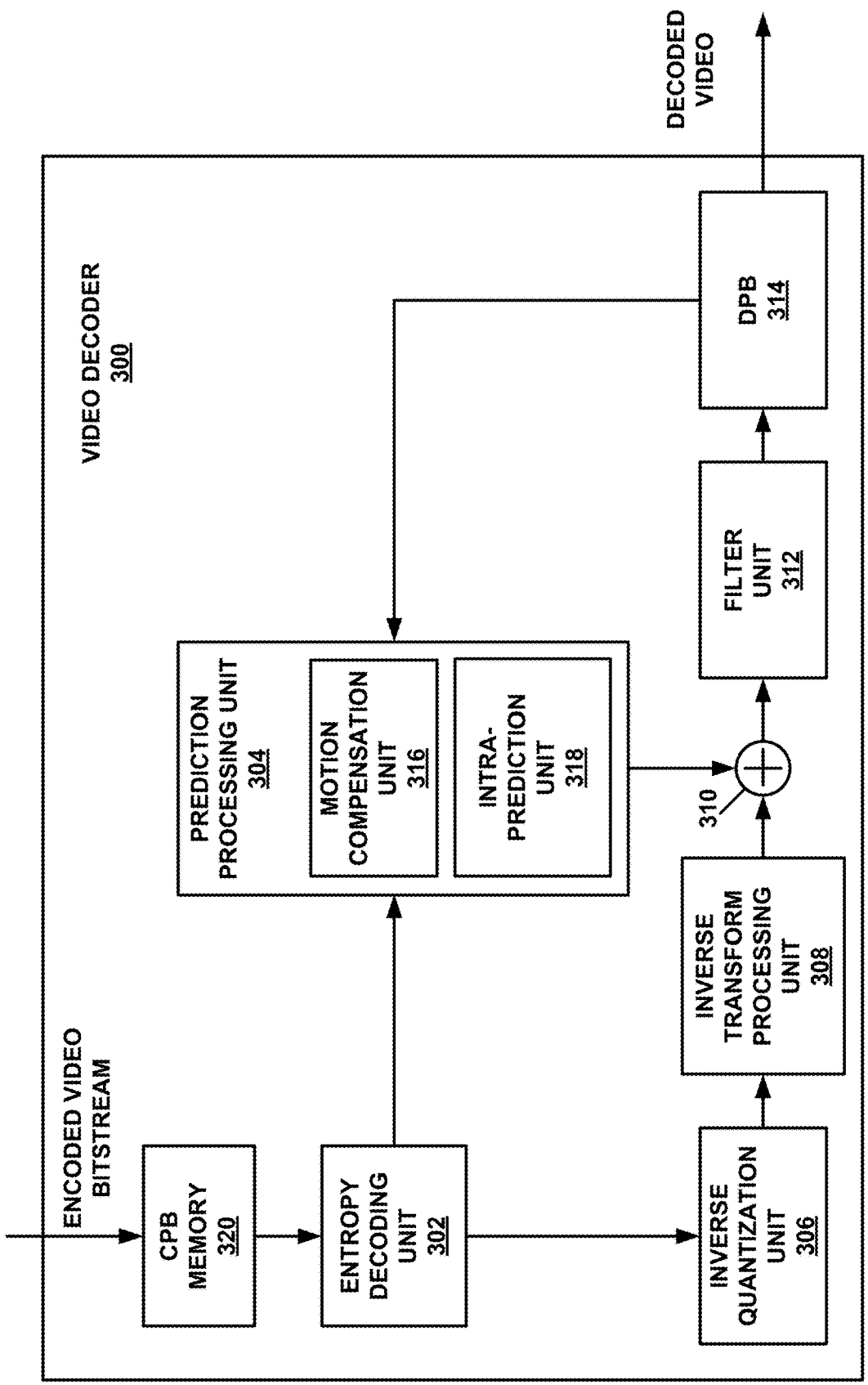
FIG. 16 is a block diagram illustrating an example video decoder that may perform the techniques of this disclosure.

FIG. 16 is a block diagram illustrating an example video decoder 300 that may perform the techniques of this disclosure. FIG. 16 is provided for purposes of explanation and is not limiting on the techniques as broadly exemplified and described in this disclosure. For purposes of explanation, this disclosure describes video decoder 300 according to the techniques of VVC, and HEVC. However, the techniques of this disclosure may be performed by video coding devices that are configured to other video coding standards.

In the example of FIG. 16, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 16 are illustrated to assist with understanding the operations performed by video decoder 300. The units may be implemented as fixed-function circuits, programmable circuits, or a combination thereof. Similar to FIG. 15, fixed-function circuits refer to circuits that provide particular functionality and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 15).

As another example, if the prediction information syntax elements indicate that the current block is intra predicted, intra-prediction unit 318 may generate the prediction block according to an intra prediction mode indicated by the prediction information syntax elements. Again, intra-prediction unit 318 may generally perform the intra prediction process in a manner that is substantially similar to that described with respect to intra-prediction unit 226 (FIG. 15). Intra-prediction unit 318 may retrieve data of neighboring samples to the current block from DPB 314.

Intra-prediction unit 318 may, in an example in accordance with one or more techniques of this disclosure, determine a set of wide-angle intra prediction directions based on a derive-from block size. In this example, the derive-from block size is a block size for a first color component of a current block of the video data. Additionally, in this example, intra-prediction unit 318 may use a wide-angle intra prediction direction in the set of wide-angle intra prediction directions to generate a prediction block for a second color component of the current block of the video data. In this example, the second color component is different from the first color component.

In some examples, intra-prediction unit 318 may select a set of wide-angle intra prediction directions based on a size of a luma block of a picture having a YUV 4:2:2 chroma sampling format. Additionally, intra-prediction unit 318 may determine an intra prediction direction for the luma block. The intra prediction direction for the luma block is in the set of wide-angle intra prediction directions. Furthermore, intra-prediction unit 318 may determine an intra prediction direction for a chroma block. The luma block is collocated in the picture with the chroma block, the chroma block has a different width/height ratio than the luma block, and the intra prediction direction for the chroma block is guaranteed to have the intra prediction direction for the luma block. Intra-prediction unit 318 may use the intra prediction direction for the luma block to generate a prediction block for the luma block. Additionally, intra-prediction unit 318 may use the intra prediction direction for the chroma block to generate a prediction block for the chroma block.

In another example in accordance with one or more techniques of this disclosure, intra-prediction unit 318 may determine, based on an intra mode information of a first color component of a current block of the video data being used for a second color component of the current block and based on a mapping between intra prediction angles of the first color component and the second color component, an intra prediction mode. In this example, the second color component is different from the first color component. Furthermore, in this example, intra-prediction unit 318 may generate, based on the intra prediction mode, a prediction block for the second color component of the current block.

In another example in accordance with one or more techniques of this disclosure, intra-prediction unit 318 may determine a set of reference samples for a current sample of a current block of the video data that is formatted in YUV 4:2:2 mode. Additionally, intra-prediction unit 318 may determine weights for the reference samples. As part of determining the weights for the reference samples, intra-prediction unit 318 may multiply a horizontal distance in number of pixels of a reference sample by 2. Furthermore, intra-prediction unit 318 may calculate, based on the weights, a weighted average of the reference samples. Intra-prediction unit 318 may include the weighted average of the reference samples in a prediction block for the current block.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, in some samples, video decoder 300 represents an example of a video decoding device including a memory configured to store video data, and one or more processing units implemented in circuitry and configured to determine a set of wide-angle intra prediction directions based on a derive-from block size, the derive-from block size being a block size for a first color component of a current block of the video data; use a wide-angle intra prediction direction in the set of wide-angle intra prediction directions to generate a prediction block for a second color component of the current block of the video data, the second color component being different from the first color component; and decode the current block based on the prediction block.

In some examples, video decoder 300 represents an example of a video encoding including a memory configured to store video data, and one or more processing units implemented in circuitry and configured to select a set of wide-angle intra prediction directions based on a size of a luma block of a picture having a YUV 4:2:2 chroma sampling format; determine an intra prediction direction for the luma block, wherein the intra prediction direction for the luma block is in the set of wide-angle intra prediction directions; determine an intra prediction direction for a chroma block, wherein: the luma block is collocated in the picture with the chroma block, the chroma block has a different width/height ratio than the luma block, and the intra prediction direction for the chroma block is guaranteed to have the intra prediction direction for the luma block; use the intra prediction direction for the luma block to generate a prediction block for the luma block; use the intra prediction direction for the chroma block to generate a prediction block for the chroma block; decode the luma block based on the prediction block for the luma block; and decode the chroma block based on the prediction block for the chroma block.

In some examples, video decoder 300 represents an example of a video decoding device including a memory configured to store video data, and one or more processing units implemented in circuitry and configured to, based on an intra mode information of a first color component of a current block of the video data being used for a second color component of the current block, determine, based on a mapping between intra prediction angles of the first color component and the second color component, an intra prediction mode, the second color component being different from the first color component; generate, based on the intra prediction mode, a prediction block for the second color component of the current block; and decode the current block based on the prediction block.

In some examples, video decoder 300 represents an example of a video decoding device including a memory configured to store video data, and one or more processing units implemented in circuitry and configured to determine a set of reference samples for a current sample of a current block of the video data that is formatted in YUV 4:2:2 mode; determine weights for the reference samples, wherein determining the weights for the reference samples comprises, multiplying a horizontal distance in number of pixels of a reference sample by 2; calculate, based on the weights, a weighted average of the reference samples; include the weighted average of the reference samples in a predictive block for the current block; and decode the current block based on the prediction block.

Decoding the current block based on the prediction block may comprise adding samples of the prediction block to samples of residual data to reconstruct the current sample.

Figure 17:
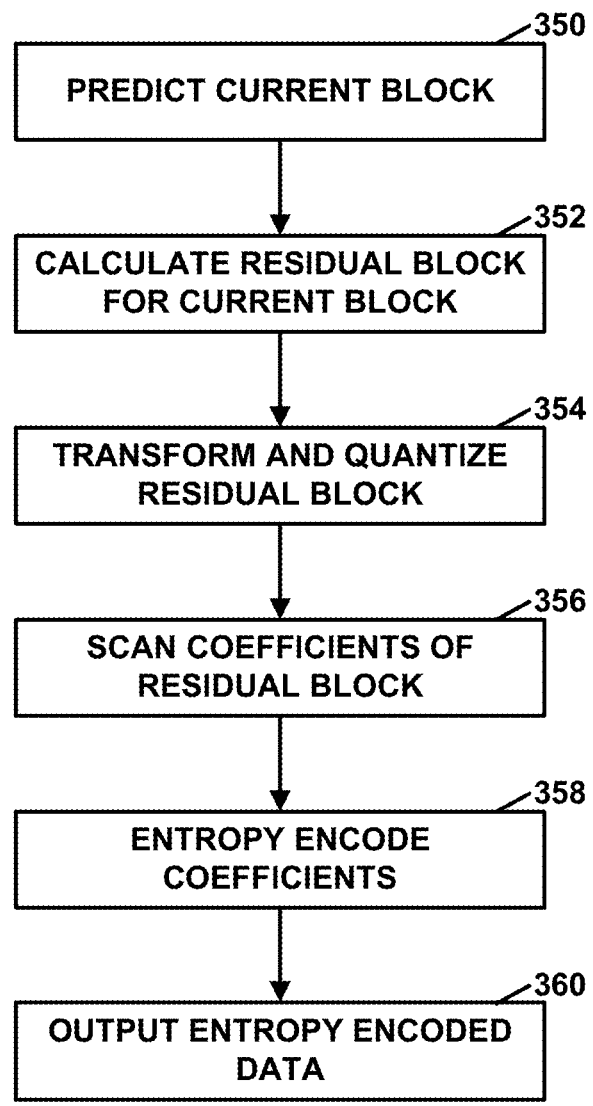
FIG. 17 is a flowchart illustrating an example method for encoding a current block.

FIG. 17 is a flowchart illustrating an example method for encoding a current block. The flowcharts of this disclosure are provided as examples. In other examples that are in accordance with this disclosure, the operations illustrated in the flowcharts of this disclosure may include more, fewer, or different actions. Furthermore, in some examples, the actions of operations illustrated in the flowcharts of this disclosure may be performed in different orders or in parallel.

In the example of FIG. 17, the current block may comprise a current CU. Although the example of FIG. 17 is described with respect to video encoder 200 (FIGS. 1 and 15), it should be understood that other devices may be configured to perform a method similar to that of FIG. 17.

Furthermore, in the example of FIG. 17, video encoder 200 initially predicts the current block (350). For example, video encoder 200 may form a luma prediction block, Cb prediction block, and a Cr prediction block for the current block. In different coding modes, video encoder 200 may use different modes for forming the prediction blocks for the current block. For instance, in accordance with one example of this disclosure, video encoder 200 (e.g., intra-prediction unit 226 of video encoder 200) may generate prediction blocks for luma and chroma blocks as described elsewhere in this disclosure, e.g., with respect to FIGS. 19, 20, and 21.

Video encoder 200 may calculate a residual block for the current block (e.g., a luma residual block for the current block or a chroma residual block for the current block) (352). To calculate the residual block, video encoder 200 may calculate a difference between the original, unencoded block and the prediction block for the current block. Video encoder 200 may then transform and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 18:
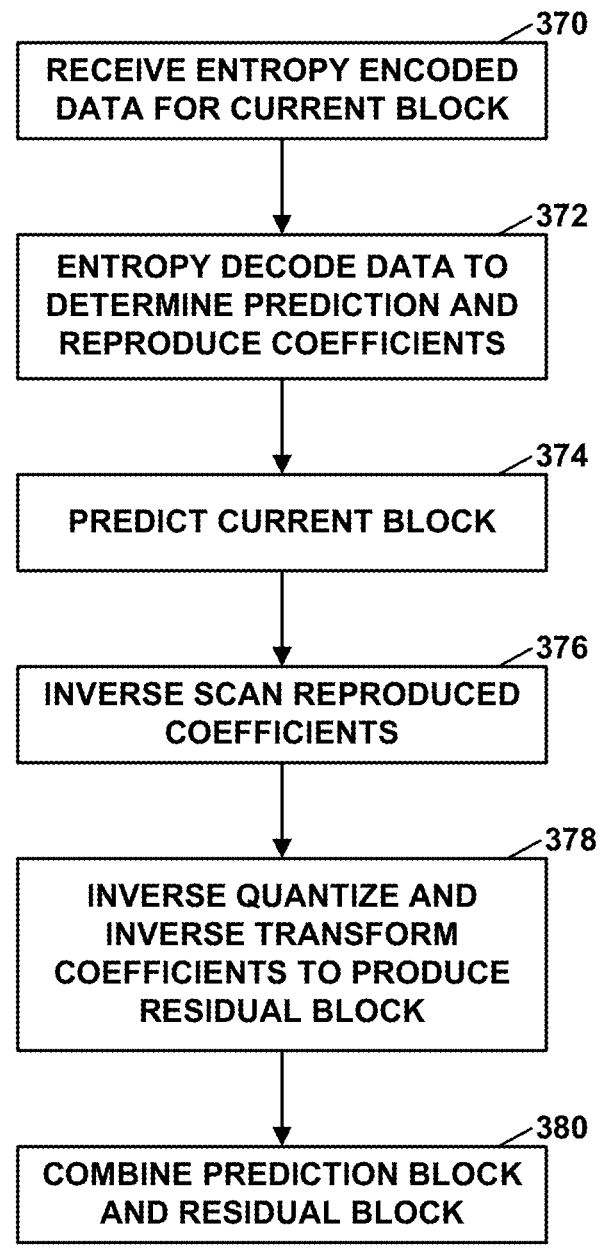
FIG. 18 is a flowchart illustrating an example method for decoding a current block of video data.

FIG. 18 is a flowchart illustrating an example method for decoding a current block of video data. The current block may comprise a current CU. Although described with respect to video decoder 300 (FIGS. 1 and 15), it should be understood that other devices may be configured to perform a method similar to that of FIG. 18.

Video decoder 300 may receive entropy encoded data for the current block, such as entropy coded prediction information and entropy coded data for transform coefficients of a residual block corresponding to the current block (370).

Video decoder 300 may entropy decode the entropy encoded data to determine prediction information for the current block and to reproduce transform coefficients of the residual block (372).

Video decoder 300 may predict the current block (374), e.g., using an intra- or inter-prediction mode as indicated by the prediction information for the current block, to calculate a prediction block for the current block. For example, video decoder 300 may form a luma prediction block, Cb prediction block, and a Cr prediction block for the current block. In different coding modes, video decoder 300 may use different modes to form the prediction blocks for the current block. For instance, video decoder 300 (e.g., intra-prediction unit 318 of video decoder 300) may generate prediction blocks for luma and chroma blocks as described elsewhere in this disclosure, e.g., with respect to FIGS. 19, 20, and 21.

Video decoder 300 may inverse scan the reproduced transform coefficients (376) to create a block of quantized transform coefficients. Video decoder 300 may then inverse quantize and inverse transform the transform coefficients to produce a residual block (e.g., a luma residual block or a chroma residual block) (378). Video decoder 300 may ultimately decode the current block by combining the prediction block and the residual block (380).

Figure 19:
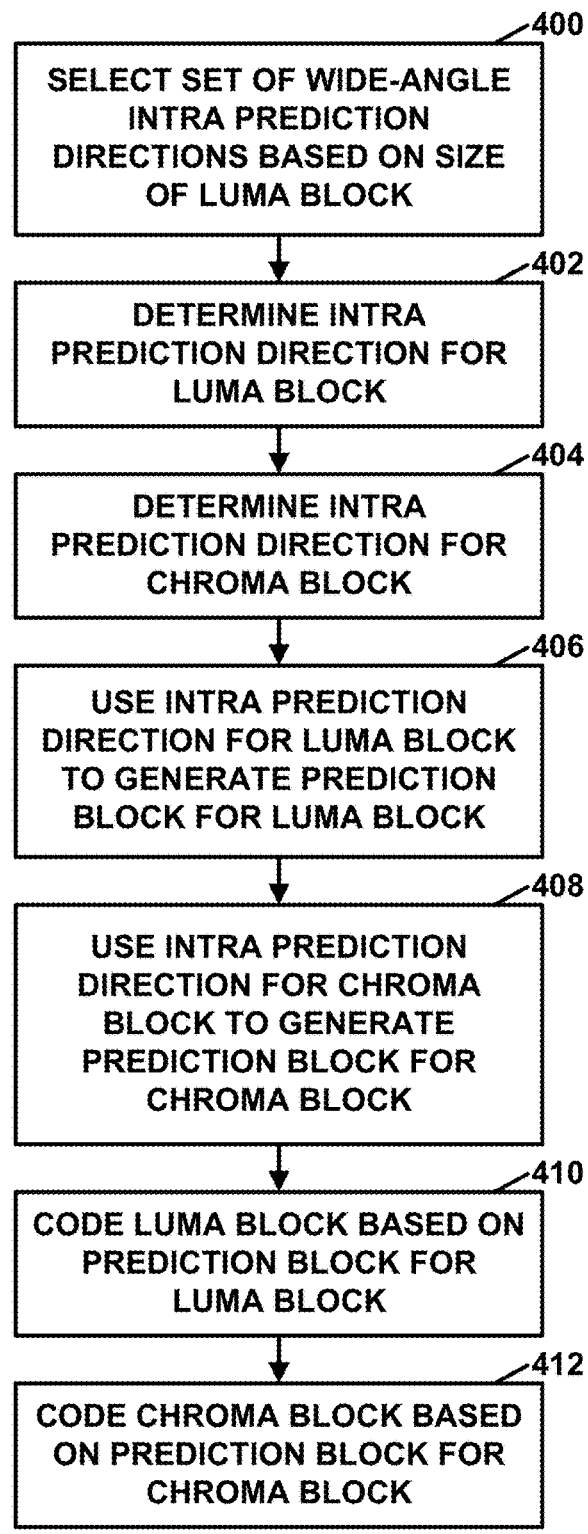
FIG. 19 is a flowchart illustrating an example operation of a video coder, in accordance with one or more techniques of this disclosure.

FIG. 19 is a flowchart illustrating an example operation of a video coder, in accordance with one or more techniques of this disclosure. The example operation of FIG. 19 may be performed by video encoder 200 or video decoder 300. In some examples, intra-prediction unit 226 of video encoder 200 or intra-prediction unit 318 of video decoder 300 may perform actions 400 through 408 of FIG. 19.

In the example of FIG. 19, the video coder selects a set of wide-angle intra prediction directions based on a size of a luma block of a picture having a YUV 4:2:2 chroma sampling format (400). For instance, in one example, to select the set of wide-angle intra prediction directions, the video coder may determine a first set of intra prediction directions based on the size of the luma block. In this example, the video coder may remove the first set of intra prediction directions from a second set of intra prediction directions. The second set of intra prediction directions may range from 45 degrees to −135 degrees. The video coder may then add the set of wide-angle intra prediction directions to the second set of intra prediction directions. The wide-angle intra prediction directions make use of mode indexes of the first set of intra prediction directions. The set of wide-angle intra prediction directions may include one or more intra prediction directions beyond 45 degrees or beyond −135 degrees. In some examples, the video coder may apply a process of Versatile Video Coding (VVC) to determine the set of wide-angle intra prediction directions based on the derive-from block size.

As noted above, the video coder may determine a first set of intra prediction directions. The first set of intra prediction directions may include or consist of intra prediction directions in the second set of intra prediction directions that are beyond a bottom-left direction of the luma block if the width of the luma block is greater than the height of the luma block. The first set of intra prediction directions may include or consist of intra prediction directions in the second set of intra prediction directions that are beyond a top-right direction of the luma block if the height of the luma block is greater than the width of the luma block.

Furthermore, in the example of FIG. 19, the video coder may determine an intra prediction direction for the luma block (402). The intra prediction direction for the luma block is in the second set of intra prediction directions. For instance, the intra prediction direction for the luma block may be in the set of wide-angle intra prediction directions.

In examples where the video coder is video encoder 200, video encoder 200 may select the intra prediction direction for the luma block from the second set of intra prediction directions after adding the set of wide-angle intra prediction directions to the second set of intra prediction directions. For instance, video encoder 200 may perform a rate-distortion analysis on two or more of the intra prediction directions in the second set of intra prediction directions to determine the intra prediction direction for the luma block. In examples where the video coder is video decoder 300, video decoder 300 may determine an intra prediction mode indicated by signaled prediction information syntax elements. The intra prediction mode corresponds to the intra prediction direction for the luma block.

Additionally, in FIG. 19, the video coder determines an intra prediction direction for a chroma block (404). The luma block is collocated in the picture with the chroma block. Furthermore, the chroma block has a different width/height ratio than the luma block. In accordance with a technique of this disclosure, the intra prediction direction for the chroma block is guaranteed to have the intra prediction direction for the luma block. In other words, regardless of the intra prediction direction for the luma block, the intra prediction direction for the chroma block is the same as the intra prediction direction for the luma block. In this way, the video coder may determine the intra prediction direction for the chroma block such that the intra prediction for the chroma block is the same as the intra prediction direction for the luma block. This stands in contrast to the situation in which the intra prediction direction for the luma block is unavailable for use as the intra prediction direction for the chroma block because the set of wide-angle intra prediction directions is selected based on the size of the chroma block (e.g., as shown in the example of FIG. 9A and FIG. 9B).

As shown in FIG. 19, the video coder may use the intra prediction direction for the luma block to generate a prediction block for the luma block (406). Likewise, the video coder may use the intra prediction direction for the chroma block to generate a prediction block for the chroma block (408). The video coder may use the intra prediction directions for the luma and chroma blocks to generate prediction blocks for the luma and chroma blocks as described elsewhere in this disclosure. For instance, the video coder may generate a prediction block by identifying, based on the intra prediction mode, a reference location for a sample of the prediction block. The video coder may determine a value for the reference location and may set the sample of the prediction block to the determined value.

Furthermore, the video coder may code the luma block based on the prediction block for the luma block (410). The video coder may also code the chroma block based on the prediction block for the chroma block (412). In examples where the video coder is video encoder 200, video encoder 200 may encode the luma block based on the prediction block for the luma block and video encoder 200 may encode the chroma block based on the prediction block for the chroma block. For instance, residual generation unit 204 of video encoder 200 may generate residual data for the luma block based on samples of the luma block and the prediction block for the luma block. Similarly, residual generation unit 204 of video encoder 200 may generate residual data for the chroma block based on samples of the chroma block and the prediction block for the chroma block.

In examples where the video coder is video decoder 300, video decoder 300 may decode the luma block based on the prediction block for the luma block and video decoder 300 may decode the chroma block based on the prediction block for the chroma block. For instance, reconstruction unit 310 of video decoder 300 may reconstruct the luma block based on the prediction block for the luma block and residual data for the luma block. Similarly, reconstruction unit 310 of video decoder 300 may reconstruct the chroma block based on the prediction block for the chroma block and residual data for the chroma block.

Figure 20:
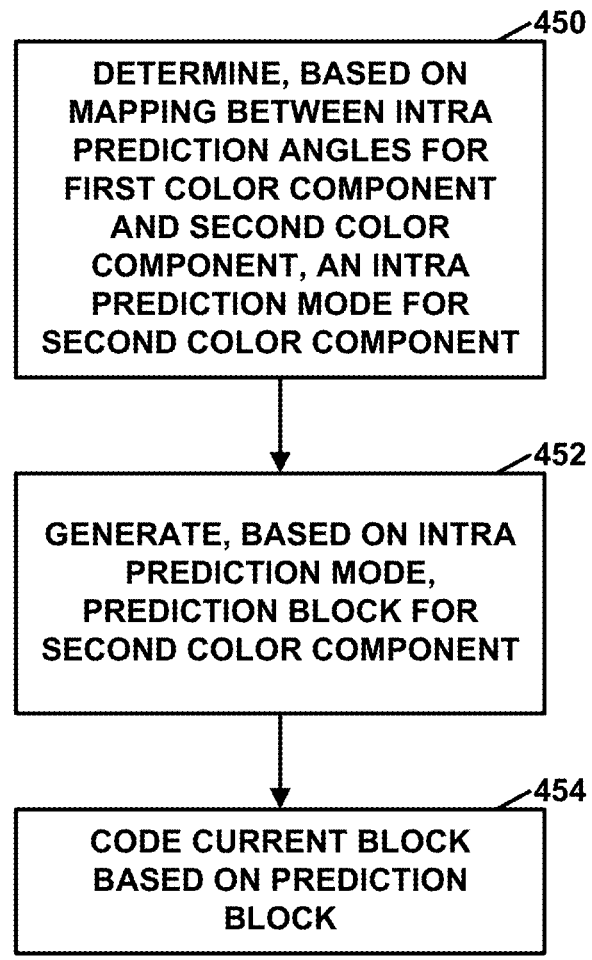
FIG. 20 is a flowchart illustrating an example operation of a video coder, in accordance with one or more techniques of this disclosure.

FIG. 20 is a flowchart illustrating an example operation of a video coder, in accordance with one or more techniques of this disclosure. The example operation of FIG. 20 may be performed by video encoder 200 or video decoder 300. In some examples, intra-prediction unit 226 of video encoder 200 or intra-prediction unit 318 of video decoder 300 may perform actions 450 through 452 of FIG. 21.

In the example of FIG. 20, as part of predicting the current block, the video coder may determine an intra prediction mode for a second color component based on a mapping between intra prediction angles of the first color component and the second color component (450). The video coder may determine the mapping in accordance with any of the examples provided elsewhere in this disclosure.

Furthermore, in the example of FIG. 20, the video coder may generate, based on the intra prediction mode, a prediction block for the second color component of the current block (452). For instance, the video coder may generate the prediction block by identifying, based on the intra prediction mode, a reference location for a sample of the prediction block for the second color component. The video coder may determine a value for the reference location and may set the sample of the prediction block for the second color component to the determined value.

The video coder may then code the current block based on the prediction block (454). For instance, in examples where the video coder is video encoder 200, video encoder 200 (e.g., residual generation unit 204 of video encoder 200) may generate, as part of encoding the current block, residual data indicating differences between samples of the second color component of the current block and corresponding samples of the prediction block for the second color component of the current block. Video decoder 300 (e.g., reconstruction unit 310) may reconstruct, as part of decoding the current block, the second color component of the current block by adding residual samples to corresponding samples of the prediction block for the second color component of the current block.

Figure 21:
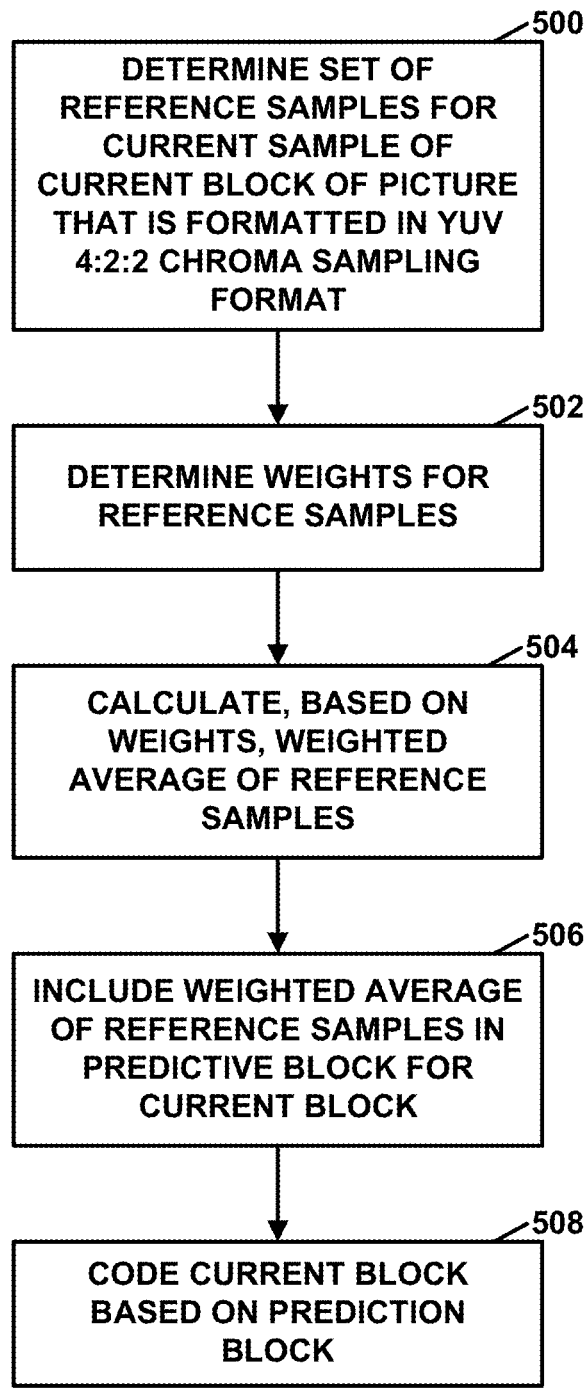
FIG. 21 is a flowchart illustrating an example operation of a video coder, in accordance with one or more techniques of this disclosure.

FIG. 21 is a flowchart illustrating an example operation of a video coder, in accordance with one or more techniques of this disclosure. The example operation of FIG. 21 may be performed by video encoder 200 or video decoder 300. In some examples, intra-prediction unit 226 of video encoder 200 or intra-prediction unit 318 of video decoder 300 may perform actions 500 through 506 of FIG. 21.

In the example of FIG. 21, the video coder may determine a set of reference samples for a current sample of a current block of a picture of the video data that is formatted in the YUV 4:2:2 chroma sampling format (500). For instance, the video coder may determine the set of reference samples in the manner described above with respect to the example of FIG. 13. For instance, the set of reference samples for the current sample may include one or more of a top sample, a top-left sample, and a left sample. The top sample is directly above the current sample in an above neighboring block, the top-left sample is above and left of a top-left sample of the current block, and the left sample is directly left of the current sample in a left neighboring block.

Additionally, in the example of FIG. 21, the video coder may determine weights for the reference samples (502). In accordance with a technique of this disclosure, the video coder may determine the weights for the reference sample based on sample position distances, not pixel number differences. The sample position distances may differ from the pixel number differences when the current block is a chroma block in a picture that is formatted in the YUV 4:2:2 chroma sampling format because the sample position distances count the positions for luma samples that are not present in the chroma block. Thus, in the example of FIG. 13, because the picture is formatted in the YUV 4:2:2 chroma sampling format and every other chroma sample is skipped in the horizontal direction in the YUV 4:2:2 chroma sampling format, the video coder may, as part of determining the weights for the reference samples, multiply a horizontal distance in number of pixels of a reference sample by 2. Because chroma samples are not skipped in the vertical direction in the YUV 4:2:2 chroma sampling format, the video coder does not multiply the vertical distance in number of pixels from the current sample to the reference sample by 2. The video coder may determine a weight for a reference sample as a sum of the horizontal and vertical sample position distances from the current sample to the reference sample divided by a sum of the horizontal and vertical sample position distances from the current sample to each of the reference samples.

The video coder may calculate, based on the weights, a weighted average of the reference samples (504). The video decoder may then include the weighted average of the reference samples in a predictive block for the current block (506). The video coder may code the current block base on the prediction block (508). For instance, video encoder 200 (e.g., residual generation unit 204 of video encoder 200) may generate residual data indicating differences between samples of the current block and corresponding samples of the prediction block. To code the current block based on the prediction block, video decoder 300 (e.g., reconstruction unit 310 of video decoder 300) may reconstruct the current block by adding residual data to corresponding samples of the prediction block.

The following paragraphs include an enumerated, non-limiting listing of examples that are in accordance with one or more techniques of this disclosure.

Example 1. A method of coding video data, the method comprising: determining a set of wide-angle intra prediction directions based on a derive-from block size, the derive-from block size being a block size for a first color component of a current block of the video data; using a wide-angle intra prediction direction in the set of wide-angle intra prediction directions to generate a prediction block for a second color component of the current block of the video data, the second color component being different from the first color component; and coding the current block based on the prediction block.

Example 2. A method of coding video data, the method comprising: based on an intra mode information of a first color component of a current block of the video data being used for a second color component of the current block, determining, based on a mapping between intra prediction angles of the first color component and the second color component, an intra prediction mode, the second color component being different from the first color component; generating, based on the intra prediction mode, a prediction block for the second color component of the current block; and coding the current block based on the prediction block.

Example 3. The method of example 2, wherein the first color component is a luma color component and the second color component is a chroma color component.

Example 4. The method of any of examples 2-3, wherein: the first color component is a derive-from color component and the second color component is a derive-to color component, determining the intra prediction mode comprises: based on the derive-to component and the derive-from component not having a same set of possible intra prediction directions, mapping each intra prediction direction of the derive-from component to derive-to components by scaling intra prediction angles of the derive-from component based on a horizontal sample frequency ratio between the first and second color components and a vertical sample frequency ratio between the first and second color components.

Example 5. A method of coding video data, the method comprising: determining a set of reference samples for a current sample of a current block of the video data that is formatted in YUV 4:2:2 mode; determining weights for the reference samples, wherein determining the weights for the reference samples comprises, multiplying a horizontal distance in number of pixels of a reference sample by 2; calculating, based on the weights, a weighted average of the reference samples; including the weighted average of the reference samples in a predictive block for the current block; and coding the current block based on the prediction block.

Example 6. The method of any of examples 1-5, wherein coding comprises decoding.

Example 7. The method of any of examples 1-5, wherein coding comprises encoding.

Example 8. A device for coding video data, the device comprising one or more means for performing the method of any of examples 1-5.

Example 9. The device of example 8, wherein the one or more means comprise one or more processors implemented in circuitry.

Example 10. The device of any of examples 8 and 9, further comprising a memory to store the video data.

Example 11. The device of any of examples 8-10, further comprising a display configured to display decoded video data.

Example 12. The device of any of examples 8-11, wherein the device comprises one or more of a camera, a computer, a mobile device, a broadcast receiver device, or a set-top box.

Example 13. The device of any of examples 8-12, wherein the device comprises a video decoder.

Example 14. The device of any of examples 8-13, wherein the device comprises a video encoder.

Example 15. A computer-readable storage medium having stored thereon instructions that, when executed, cause one or more processors to perform the method of any of examples 1-5.

Example 16. A device for encoding video data, the device comprising means for performing the method of any of examples 1-5.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
   selecting a set of wide-angle intra prediction directions based on a size of a luma block of a picture having a YUV 4:2:2 chroma sampling format;
   determining an intra prediction direction for the luma block, wherein the intra prediction direction for the luma block is in the set of wide-angle intra prediction directions;
   determining an intra prediction direction for a chroma block, wherein:
      the luma block is collocated in the picture with the chroma block,
      the chroma block has a different width/height ratio than the luma block, and
      the intra prediction direction for the chroma block is guaranteed to have the intra prediction direction for the luma block;
   using the intra prediction direction for the luma block to generate a prediction block for the luma block;
   using the intra prediction direction for the chroma block to generate a prediction block for the chroma block;
   coding the luma block based on the prediction block for the luma block; and
   coding the chroma block based on the prediction block for the chroma block.

2. The method of claim 1, wherein selecting the set of wide-angle intra prediction directions comprises:
   determining a first set of intra prediction directions based on the size of the luma block;
   removing the first set of intra prediction directions from a second set of intra prediction directions, wherein the second set of intra prediction directions range from 45 degrees to −135 degrees; and
   adding the set of wide-angle intra prediction directions to the second set of intra prediction directions, wherein the wide-angle intra prediction directions make use of mode indexes of the first set of intra prediction directions.

3. The method of claim 2, wherein:
   coding the chroma block comprises encoding the chroma block,
   the method further comprises selecting the intra prediction direction for the luma block from the second set of intra prediction directions after adding the set of wide-angle intra prediction directions to the second set of intra prediction directions; and
   determining the intra prediction direction for the chroma block comprises determining the intra prediction direction for the chroma block such that the intra prediction direction for the chroma block is the same as the intra prediction direction for the luma block.

4. The method of claim 1, wherein determining the intra prediction direction for the luma block comprises determining an intra prediction mode indicated by prediction information syntax elements, wherein the intra prediction mode corresponds to the intra prediction direction for the luma block.

5. The method of claim 1, wherein the set of wide-angle intra prediction directions includes one or more intra prediction directions beyond 45 degrees or beyond −135 degrees.

6. The method of claim 1, wherein selecting the set of wide-angle intra prediction directions for the chroma block comprises a process of Versatile Video Coding (VVC) to determine the set of wide-angle intra prediction directions based on a derive-from block size.

7. The method of claim 1, wherein:
coding the luma block comprises decoding the luma block based on the prediction block for the luma block, and
coding the chroma block comprises decoding the chroma block based on the prediction block for the chroma block.

8. The method of claim 7, wherein:
decoding the luma block based on the prediction block for the luma block comprises reconstructing the luma block based on the prediction block for the luma block and residual data for the luma block, and
decoding the chroma block based on the prediction block for the chroma block comprises reconstructing the chroma block based on the prediction block for the chroma block and residual data for the chroma block.

9. The method of claim 1, wherein:
coding the luma block comprises encoding the luma block based on the prediction block for the luma block, and
coding the chroma block comprises encoding the chroma block based on the prediction block for the chroma block.

10. The method of claim 9, wherein:
encoding the luma block comprises generating residual data for the luma block based on samples of the luma block and the prediction block for the luma block, and
encoding the chroma block comprises generating residual data for the chroma block based on samples of the chroma block and the prediction block for the chroma block.

11. A device for coding video data, the device comprising:
a memory to store the video data; and
one or more processors implemented in circuitry, wherein the one or more processors are configured to:
  select a set of wide-angle intra prediction directions based on a size of a luma block of a picture having a YUV 4:2:2 chroma sampling format;
  determine an intra prediction direction for the luma block, wherein the intra prediction direction for the luma block is in the set of wide-angle intra prediction directions;
  determine an intra prediction direction for a chroma block, wherein:
    the luma block is collocated in the picture with the chroma block,
    the chroma block has a different width/height ratio than the luma block, and
    the intra prediction direction for the chroma block is guaranteed to have the intra prediction direction for the luma block;
  use the intra prediction direction for the luma block to generate a prediction block for the luma block;
  use the intra prediction direction for the chroma block to generate a prediction block for the chroma block;
  code the luma block based on the prediction block for the luma block; and
  code the chroma block based on the prediction block for the chroma block.

12. The device of claim 11, wherein to select the set of wide-angle intra prediction directions, the one or more processors are configured to:
determine a first set of intra prediction directions based on the size of the luma block;
remove the first set of intra prediction directions from a second set of intra prediction directions, wherein the second set of intra prediction directions range from 45 degrees to −135 degrees; and
add the set of wide-angle intra prediction directions to the second set of intra prediction directions, wherein the wide-angle intra prediction directions make use of mode indexes of the first set of intra prediction directions.

13. The device of claim 12, wherein:
the one or more processors are further configured to select the intra prediction direction for the luma block from the second set of intra prediction directions after adding the set of wide-angle intra prediction directions to the second set of intra prediction directions; and
to determine the intra prediction direction for the chroma block, the one or more processors are configured to determine the intra prediction direction for the chroma block such that the intra prediction direction for the chroma block is the same as the intra prediction direction for the luma block.

14. The device of claim 11, wherein to determine the intra prediction direction for the luma block, the one or more processors determine an intra prediction mode indicated by prediction information syntax elements, wherein the intra prediction mode corresponds to the intra prediction direction for the luma block.

15. The device of claim 11, wherein the set of wide-angle intra prediction directions includes one or more intra prediction directions beyond 45 degrees or beyond −135 degrees.

16. The device of claim 11, wherein the one or more processors perform a process of Versatile Video Coding (VVC) to determine the set of wide-angle intra prediction directions based on the derive-from block size.

17. The device of claim 11, wherein:
the one or more processors decode the luma block based on the prediction block for the luma block, and
the one or more processors decode the chroma block based on the prediction block for the chroma block.

18. The device of claim 17, wherein:
to decode the luma block based on the prediction block for the luma block, the one or more processors are configured to reconstruct the luma block based on the prediction block for the luma block and residual data for the luma block, and
to decode the chroma block based on the prediction block for the chroma block, the one or more processors are configured to reconstruct the chroma block based on the prediction block for the chroma block and residual data for the chroma block.

19. The device of claim 11, wherein:
the one or more processors are configured to encode the luma block based on the prediction block for the luma block, and
the one or more processors are configured to encode the chroma block based on the prediction block for the chroma block.

20. The device of claim 19, wherein:
to encode the luma block, the one or more processors are configured to generate residual data for the luma block based on samples of the luma block and the prediction block for the luma block, and
to encode the chroma block, the one or more processors are configured to generate residual data for the chroma block based on samples of the chroma block and the prediction block for the chroma block.

21. The device of claim 11, further comprising a display configured to display decoded video data.

22. The device of claim 11, wherein the device comprises one or more of a camera, a computer, a mobile device, a broadcast receiver device, or a set-top box.

23. A device for coding video data, the device comprising:
   means for selecting a set of wide-angle intra prediction directions based on a size of a luma block of a picture having a YUV 4:2:2 chroma sampling format;
   means for determining an intra prediction direction for the luma block, wherein the intra prediction direction for the luma block is in the set of wide-angle intra prediction directions;
   means for determining an intra prediction direction for a chroma block, wherein:
      the luma block is collocated in the picture with the chroma block,
      the chroma block has a different width/height ratio than the luma block, and
      the intra prediction direction for the chroma block is guaranteed to have the intra prediction direction for the luma block;
   means for using the intra prediction direction for the luma block to generate a prediction block for the luma block;
   means for using the intra prediction direction for the chroma block to generate a prediction block for the chroma block;
   means for coding the luma block based on the prediction block for the luma block; and
   means for coding the chroma block based on the prediction block for the chroma block.

24. A computer-readable storage medium having stored thereon instructions that, when executed, cause one or more processors to:
   select a set of wide-angle intra prediction directions based on a size of a luma block of a picture having a YUV 4:2:2 chroma sampling format;
   determine an intra prediction direction for the luma block, wherein the intra prediction direction for the luma block is in the set of wide-angle intra prediction directions;
   determine an intra prediction direction for a chroma block, wherein:
      the luma block is collocated in the picture with the chroma block,
      the chroma block has a different width/height ratio than the luma block,
      the intra prediction direction for the chroma block is guaranteed to have the intra prediction direction for the luma block;
   use the intra prediction direction for the luma block to generate a prediction block for the luma block;
   use the intra prediction direction for the chroma block to generate a prediction block for the chroma block;
   code the luma block based on the prediction block for the luma block; and
   code the chroma block based on the prediction block for the chroma block.

* * * * *